US007834806B2

(12) United States Patent
Tucker et al.

(10) Patent No.: US 7,834,806 B2
(45) Date of Patent: Nov. 16, 2010

(54) SYSTEM AND METHOD FOR UTILITY ASSET DATA COLLECTION AND MANAGEMENT

(75) Inventors: Layne D. Tucker, Grande Prairie (CA); John Lepper, Carpenteria, CA (US); Daniel E. Colby, Newark, OH (US); Page Tucker, Charlotte, NC (US); Tom Y. Sawyer, Jr., Palisade, CO (US)

(73) Assignee: Global Precision Solutions, LLP, Grand Junction, CO (US)

( * ) Notice: Subject to any disclaimer, the term of this patent is extended or adjusted under 35 U.S.C. 154(b) by 68 days.

(21) Appl. No.: 12/350,141

(22) Filed: Jan. 7, 2009

(65) Prior Publication Data

US 2009/0121933 A1 May 14, 2009

Related U.S. Application Data

(62) Division of application No. 11/185,579, filed on Jul. 19, 2005, now Pat. No. 7,482,973.

(60) Provisional application No. 60/589,307, filed on Jul. 20, 2004.

(51) Int. Cl.
  *G01S 19/25* (2010.01)

(52) U.S. Cl. .................................................. 342/357.64
(58) Field of Classification Search ............ 342/357.02, 342/357.64
See application file for complete search history.

(56) References Cited

U.S. PATENT DOCUMENTS 3,997,795 A * 12/1976 Pohl et al. ................. 250/208.1
5,214,757 A    5/1993 Mauney et al.
(Continued)

FOREIGN PATENT DOCUMENTS

CA    2 416 513 A1    7/2004

(Continued)

OTHER PUBLICATIONS

International Search Report for International Application No. PCT/US2005/025724 (4 pages), Search Completed Jan. 27, 2006; International search Report—Information on Patent Family Members (1 page); Written Opinion of the International Searching Authority (15 pages).

(Continued)

*Primary Examiner*—Thomas H Tarcza
*Assistant Examiner*—Harry Liu
(74) *Attorney, Agent, or Firm*—Christie, Parker & Hale, LLP.

(57) ABSTRACT

A method and apparatus, including software, for the development and operational use of precise utility location and utility asset management information. Field-usable data sets may be produced that meet standards of accuracy and usability that are sufficient for use by field operations personnel participating in damage prevention activities associated with ground penetrating projects (e.g., excavating, trenching, boring, driving, and tunneling) or other asset applications. Some embodiments relate to integrating utility asset data including coordinate location, and geographical information data using a consistently available and accurate coordinates reference for collecting the data and for aligning the geographical information data. Some embodiments relate to managing projects with equipment that provides real time images and the updating of the data as required with this desired accuracy.

14 Claims, 17 Drawing Sheets

U.S. PATENT DOCUMENTS

| | | | |
|---|---|---|---|
| 6,232,880 B1 | 5/2001 | Anderson et al. | |
| 6,282,477 B1* | 8/2001 | Gudat et al. | 701/50 |
| 6,308,787 B1 | 10/2001 | Alft | |
| 6,315,062 B1 | 11/2001 | Alft et al. | |
| 6,388,629 B1 | 5/2002 | Albats, Jr. et al. | |
| 6,389,360 B1 | 5/2002 | Alft et al. | |
| 6,435,286 B1 | 8/2002 | Stump et al. | |
| 6,470,976 B2 | 10/2002 | Alft et al. | |
| 6,473,033 B1* | 10/2002 | Trimble | 342/357.14 |
| 6,484,818 B2 | 11/2002 | Alft et al. | |
| 6,574,561 B2 | 6/2003 | Alexander et al. | |
| 6,577,954 B2 | 6/2003 | Alft et al. | |
| 6,668,946 B2 | 12/2003 | Rankin et al. | |
| 6,674,445 B1 | 1/2004 | Chithambaram et al. | |
| 6,677,938 B1 | 1/2004 | Maynard | |
| 6,700,526 B2 | 3/2004 | Witten | |
| 6,719,069 B2 | 4/2004 | Alft et al. | |
| 6,735,888 B2 | 5/2004 | Green et al. | |
| 6,749,029 B2 | 6/2004 | Alft et al. | |
| 6,751,553 B2 | 6/2004 | Young et al. | |
| 6,755,263 B2 | 6/2004 | Alft et al. | |
| 6,766,253 B2 | 7/2004 | Burns et al. | |
| 6,778,128 B2 | 8/2004 | Tucker et al. | |
| 6,798,379 B2 | 9/2004 | Tucker et al. | |
| 6,833,795 B1 | 12/2004 | Johnson et al. | |
| 6,910,541 B2 | 6/2005 | Kelpe | |
| 6,929,075 B2 | 8/2005 | Alft et al. | |
| 6,975,942 B2 | 12/2005 | Young et al. | |
| 7,143,844 B2 | 12/2006 | Alft et al. | |
| 2003/0191568 A1 | 10/2003 | Breed | |
| 2004/0150556 A1 | 8/2004 | Tucker et al. | |
| 2004/0220731 A1 | 11/2004 | Tucker et al. | |
| 2004/0225444 A1* | 11/2004 | Young et al. | 702/14 |
| 2005/0194182 A1 | 9/2005 | Rodney et al. | |

FOREIGN PATENT DOCUMENTS

| | | |
|---|---|---|
| EP | 0 683 401 A2 | 11/1995 |
| WO | WO 02/33443 A2 | 4/2002 |
| WO | WO 02/33443 A3 | 4/2002 |

OTHER PUBLICATIONS

Smits, P.C. et al. "*INSPIRE Architecture and Standards Position Paper*" 'Online! Oct. 3, 2002, pp. 1-64. Retrieved from the Internet: URL:http://www.ec-gis.org/inspire/reports/position_papers/inspire_ast_pp_v4_3_en.pdf (retrieved on Jan. 24, 2006).

Grande, A., et al. "*STANDORTBESTIMMUNG Geografische Informationssysteme Werden Immer Wichtiger.*" CT Magazin Fuer Computer Technik, Heise Zeitschriften Verlag, Hannover, DE, No. 10, May 3, 2004, pp. 84-89.

Akita, Y., et al. "*Practical Usage and Future Prospects of a Mapping System Using a Pen-Based Computer.*" Proceedings AM/FM International Annual Conference, Mar. 20, 1995, pp. 699-707.

Ogler, J.M., et al. "*Original Method for Features Extraction and Vectorization Application to Cadastral Maps.*" Robotics, Vision and Sensors, Signal Processing and Control. Maui, Nov. 15-19, 1993. Proceedings of the International Conference on Industrial Electronics, Control, and Instrumentation (IECON), New York, IEEE, US, vol. 3, Nov. 15, 1993, pp. 2098-2103.

"*Statement of Need: Utility Locating Technologies,*" 21 pages, date unknown. Available from http://www.nal.usda.gov/ttic/coverlet.htm (retrieved from the Internet on Apr. 5, 2006).

International Application No. PCT/US2005/025724. Annex to form PCT/ISA/2006. Communication Relating to the Results of the Partial International Search Report, dated Nov. 11, 2005.

* cited by examiner

SYSTEM AND METHOD FOR UTILITY ASSET DATA COLLECTION AND MANAGEMENT

CROSS-REFERENCE TO RELATED APPLICATION(S)

This application is a divisional application of U.S. patent application Ser. No. 11/185,579, filed Jul. 19, 2005, now issued as U.S. Pat. No. 7,482,973, which claims the benefit of U.S. Provisional Patent Application No. 60/589,307, filed Jul. 20, 2004, the disclosures of which are hereby incorporated by reference herein.

TECHNICAL FIELD

This application relates to a system and method for the development and operational use of precise utility location information and utility asset management information.

BACKGROUND

There are many assets above ground and below ground that need to be protected and avoided. Included in these assets are utility lines and components and protected areas, such as archeological sites and habitat of endangered species. There are millions of miles of utility lines around the world, some buried and some above ground. These utility lines include, without limitation, electric power lines, telephone lines, water lines, sewer lines, fiber-optic cable lines, natural gas transmission lines, natural gas distribution lines, and utility lines for transporting hazardous liquids.

Every year incidents occur in which mobile ground breaking equipment comes in contact with utility lines with costly results in loss of life and/or loss of money. Statistics kept by the United States Office of Pipeline Safety regarding pipelines indicate that between 1986 and 2001 there were 1286 incidents involving natural gas transmission lines, which killed 58 people, injured 217 people and caused 284 billion dollars in property damage. In that same period there were 2159 incidents involving natural gas distribution lines, which killed 282 people, injured 1264 people and caused 256 billion dollars in property damage. There were also 3034 incidents involving utility lines carrying hazardous liquids which killed 36 people, injured 244 people and caused a further 731 billion dollars in property damage. In order to understand the full impact of such incidents, one would have to also include environmental damage and economic loss as a result of a service disruption.

There have been many attempts to address damage prevention when groundbreaking equipment is used around utilities and other assets that need protection. Non-exhaustive examples of these attempts include marking the location of a utility by painted lines. Commonly in the past, the utility companies and/or service companies are called to the site to place marks (spray the ground with an identifying color; for example, red for electric lines, yellow for gas lines and so forth) on the surface to show the location of a specific utility line and/or its components. Such marking is not permanent and typically lasts only for the one earth moving operation, such as digging a trench, for which the utilities were marked.

Another approach was to make a record of the location of the utility lines as the line was placed in the earth. However, the accuracy of the location is dictated by the accuracy of the reference point. It has been found that attempting to locate a utility line based op this record has resulted in an error of up to 15 feet or more because of the inaccuracy in the position of the reference point.

Another approach is to use the record of the location of a facility, with its inherent error from inaccurate reference points, as the record to compare to the location of a piece of ground breaking equipment. This approach is disclosed in U.S. Pat. No. 6,282,477 issued on Aug. 28, 2001 to Adam J. Gudat, et al., the disclosure of which is hereby incorporated by reference herein. As noted in the Gudat et al patent at Col. 5, lines 39-50, there is a region of uncertainty that is a function of at least one parameter, including, but not limited to, inherent errors in the position determining system and errors in the determined location of the object (utility).

The determined location of the utility may be acquired by underground imaging, which is commonly accomplished by the use of ground penetrating radar. Examples of underground imaging are set forth in U.S. Pat. No. 6,766,253 issued Jul. 20, 2004; U.S. Pat. No. 6,735,888 issued May 18, 2004; U.S. Pat. No. 6,700,526 issued Mar. 2, 2004; and U.S. Pat. No. 6,388,629 issued May 14, 2004, the disclosure of each of which is hereby incorporated by reference herein.

A common way of referencing the generated data identifying location of the utility is to use a fixed object, such as the curbing of a road. An example of the use of ground penetrating radar to acquire location data for underground utilities is described in U.S. Pat. No. 6,751,553, the disclosure of which is hereby incorporated by reference herein.

SUMMARY

The invention relates to management of utility assets. For convenience, an embodiment of a system constructed or a method practiced according to the invention may be referred to herein simply as an "embodiment."

Some embodiments generate or produce highly accurate information products and applications for field use for Utility Asset Management or Utility Damage Prevention. Some embodiments produce an information product, called a Precision Integration (PI) Grid that is comprised of (above or below ground) utility location data combined with a GIS Landbase that includes satellite and/or other imagery and mapping information. In some embodiments the PI Grid advantageously provides the utility location data accurate to within 10 centimeters, without using real-time kinetics (RTK), and within millimeter accuracy using RTK. Some embodiments also provide for the accurate recall of the information based on the generation of data using precision GPS technologies that provide absolute, as opposed to relative, position data. Here, precision GPS refers to a GPS system that may provide position information with accuracy as set forth herein for PI. Utility location information may be recalled anywhere, anytime in the world with the above mentioned accuracy.

Utility data may be accurately located and captured or collected by a data logging application using precision GPS technologies. The resultant data, as a PI Grid, may be used in a damage prevention (damage avoidance) application by a Damage Prevention Module which warns users of the proximity of above or below ground utilities in order to avoid damage due to conflict.

Some embodiments are comprised of component technologies, processes and methods that generate Information Products and provide for the productive use in the field and certify its accuracy and applicability for use on Projects that require Utility Asset Management or Damage Prevention tasks. Some embodiments provide data, tools and processes of sufficient accuracy and field operations utility that a Utility Damage Project Manager may rely on them to avoid damage to utilities due to ground breaking activities or for other Utility Asset Management tasks.

Some embodiments may be used for all phases of underground utility management, from initial planning and engineering, through construction and life-cycle maintenance. Some embodiments substantially reduce the need for redundant field measurements caused by questionable or lost markers; and through improved information displays, there may be a significant reduction in the risks associated with construction activities close to existing utilities.

Precision and Usability of Information Products

Some embodiments produce Information Products and Field Applications that meet the highest standards of accuracy and usability in the field. Some embodiments develop information products and field applications that may be used for Utility Damage Prevention, a task that may require the highest level of accuracy, reliability and currency of information. Some embodiments provide data and field applications that warn a ground breaking project of the location of above or below ground utilities. Striking or breaking a Utility can be of such consequence that tools and methods associated with this task must be of the highest reliability.

Some embodiments generate enhanced utility location data sets that meet usage criteria that are set by project managers responsible for utility asset management and/or damage prevention on a project.

In some embodiments an important component of the development of location data with the aforementioned accuracy and recall is Precision Integration (PI). In some embodiments PI is a methodology and process and technology used to assure that data points at each step of the information product development are captured using precision GPS and integrated into the information product in a manner that produces data of the accuracy previously described.

In some embodiments Precision Integration (PI) involves the use of an X,Y coordinate, and sometimes also a Z coordinate (e.g., altitude or depth), signal having a horizontal (X,Y coordinate) accuracy within 10 Centimeters (within 4 inches) without RTK and millimeter accuracy with RTK and vertical (Z coordinate) accuracy within 15 centimeters without RTK. This accuracy may be provided in collecting utility location data and in creating a GIS database, called a PI Landbase, that are combined in various steps of the system to provide a PI Grid. In some embodiments PI also involves the use of the accurate signal in creating a movable map that is displayed to show the accurate position of the data logger or other data collection or data usage device and the user in relation to the PI Landbase. The accurate signal that is used provides consistent accuracy throughout its life cycle of use (e.g., a life cycle of a project).

In some embodiments a project manager may set forth and document accuracy, completeness, currency and utility type visibility criteria and requirements for the data sets to be used for the specific project. For example, a project may require a SUE engineering A Standard for locating underground utilities. A data set may thus be created that meets the criteria set by the project manager. The completed data set may be designated a PI Grid when it meets the project usage criteria set by the project manager.

PI Grid Criteria for Field Use in Damage Prevention

In some embodiments a PI Grid is used by project managers for Utility Asset Management and Utility Damage Prevention. Data integrity requirements differ from project to project. The PI Grid may be designed to support the highest level data integrity requirement, that is, damage prevention. By supporting the highest level of data integrity requirement, value added services may be provided for the remainder of Utility Asset Management projects that have lesser standards for data integrity. In most damage prevention scenarios, there is a requirement to use ground breaking equipment in areas where conflict with utilities is probable. In some embodiments, for utility location data to be useable for damage prevention in the field, the data meets the criteria that follow.

Precision Recall (Recall). Utility information is accurately recallable. PI Grid location source data is created using precision GPS, providing absolute rather than relative positioning and location of points. Data that is recalled, even years after it is collected is precisely correct in its location. A project manager that utilizes PI Grid data may be assured that a utility is 'where the map says it is', years after the data was collected. This capability may vastly improve the locating, planning, engineering, construction, maintenance and management of underground assets.

Utility Information is Precise and Accurate (Precise). Utility location information may be within ten centimeters without RTK and within millimeters when using RTK. Precision location may be defined as being within ten centimeters without RTK and within millimeters when using RTK. A precision GPS system that may provide the accurate coordinate reference signal is manufactured by NavCom Technologies, Inc. This system is the StarFirer™ Differential Global Positioning System. Absolute, anytime, anywhere is a feature of StarFire™ DGPS.

Field-actionable data. Information provided may meet standards of accuracy, currency, completeness, accessibility and usability that allow for its operational use in utility location and damage prevention in the field. The Data Logger and the Damage Prevention Module may utilize RTI and may provide real time visual location in the context of a project area map enhanced with photo imagery of the project area. During utility data gathering the data collector can see where he is on the map, and verify the locations that he is taking against identifiable landmarks (e.g., as seen and as represented on the display). During damage prevention usage real time visual location and utility 'closeness' warning feedback may be provided to an individual or to equipment on which the module is placed. Thus, some embodiments may provide a level of visibility and human interaction that has not been provided in conventional systems.

Real Time Imagery (RTI). Utility information may be viewable in reference to imagery of the related or project area, in real time providing the current position of equipment or personnel relative to the location of utilities and may be viewable as the person or machine moves in any direction.

The PI Grid and Real Time Imagery (RTI)

In some embodiment a data set is developed which, after meeting project criteria, is designated or certified as a PI Grid. The PI Grid designation or Certification may be significant in that it may indicate to the project manager that the PI Grid meets project criteria for the use of the data in damage prevention or other utility asset management applications. The PI Grid may be presented to the user, via a computer screen, or a display as a sophisticated, intuitive, project area map that provides utility location information superimposed on imagery of the project area (e.g., a visual representation of an overhead view and other indicia). The PI Grid may be presented as a movable map that directionally turns with the movement of the person or equipment to which the computer is attached or carried. For example, as the computer is moved (changes position) or turns (changes direction) the displayed image may change accordingly (e.g., keeping the computer in the middle of the project area and orientating the project area so that it "faces" the same direction as the person or equipment). This presentation method and technology may be referred to herein as Real Time Imagery (RTI). As a user walks or rides around a project area the PI Grid, presented in RTI, may move and indicate the location of the user (e.g., via a visual representation) within the project area, while simultaneously showing the location of utilities (e.g., via a visual representation) within user defined utility location buffer areas. The capability of presenting PI Grid data in this useable, real time mode provides project managers with real time utility location data that is accurate and actionable per the operational requirements of the project manager.

Real Time Imagery (RTI) and Data Integrity

Some embodiments utilize RTI in several steps of the data development process culminating in the certification of the PI Grid. The use of RTI in data development may provide a significant advantage as compared to traditional GIS/GPS data development and collection methods that are, in effect, 'blind' in their ability to validate data in the field. In some embodiments the Data Logger (DL) utilizes RTI as a major component of its data collection application. RTI may be used to present the project area including aerial imagery for location 'sanity checks' and show the location of the user as he or she moves around the project area. RTI may show, in real-time, data points that are collected and Symbology and other meta-data attributes that may be associated with collected data. RTI may provide real-time feedback, and validation, and by facilitating 'eyes on the ground validation' may significantly increase data accuracy. Using RTI, data collectors may validate 'where they are' in a project area and validate that the data they are collecting is the 'correct data'.

The use of RTI may be particularly advantageous for damage prevention. The Damage Prevention Module (DPM) may utilize RTI to provide real-time utility location data to operators of ground penetrating equipment to avoid damaging utilities. The DPM may provide sophisticated targeting and 'lock on' capabilities that utilize user defined buffers to warn equipment operators of utilities that could be damaged by ground breaking activities.

BRIEF DESCRIPTION OF THE DRAWINGS

These and other features, aspects and advantages of the present invention will be more fully understood when considered with respect to the following detailed description, appended claims and accompanying drawings, wherein:

Figure 1:
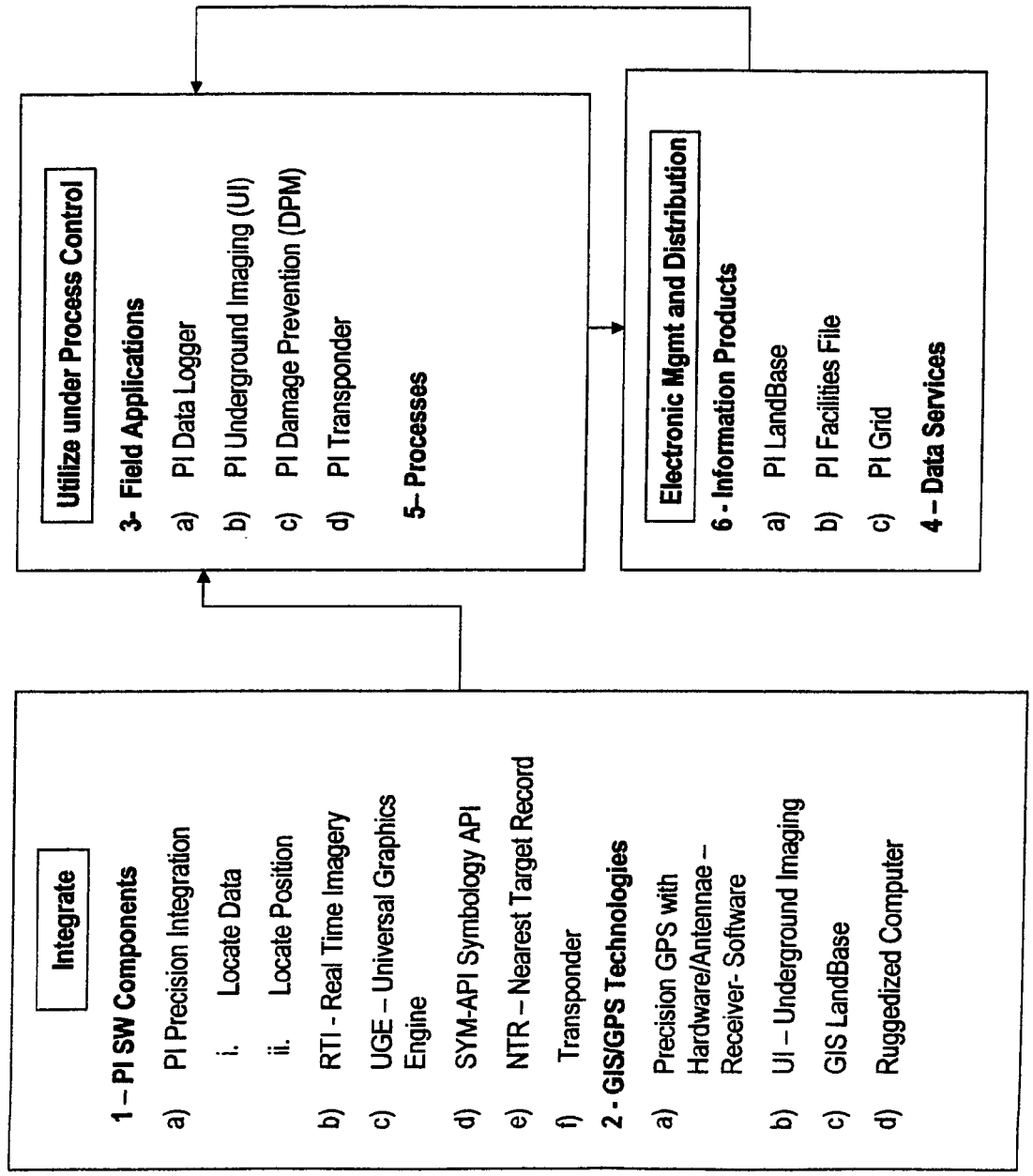
FIG. 1 is a chart listing one embodiment of major components of a system constructed in accordance with the invention.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals denote like features throughout the specification and figures.

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention. For example, references to specific structures and processes in the disclosed embodiments should be understood to be but one example of structures and processes that may be used in these or other embodiments in accordance with the teachings provided herein. Accordingly, otherwise restrictive nomenclatures such as "is," "are," etc. should be understood to include less restrictive meanings such as "may be," etc. In addition, a reference to an element by an indefinite article such as "a" does not exclude the possibility that more than one of the element is present, unless the context clearly requires that there be one and only one of the elements.

In some embodiments a system constructed or method practiced according to the invention may generate or produce highly accurate information products and applications for field use for Utility Asset Management or Utility Damage Prevention. Various aspects and features of such an embodiment will now be described in the conjunction with a system that incorporates six major components and a method that involves systems integration of the components to deliver the desired products and services. The six major components described in conjunction with the embodiment of FIG. 1 and include 1) PI SW Components; 2) GIS/GPS and Other Technologies; 3) Field Applications; 4) Data Services—Electronic Management and Distribution System; 5) Processes; and 6) Information Products.

1—PI SW Components and 2—GIS/GPS Technologies are integrated to develop or provide 3—Field Applications that are utilized under Process Control with as set forth by 5—Processes. The system, utilizing Field Applications under Process Control generates or produces 6—Information Products that are utilized at different life cycle steps by Field Applications to enhance data integrity or provide, in various forms, and on a subscription basis Information Products. Information Products are managed and distributed during their lifecycle by an Electronic Management and Distribution System.

Information Development and Services Life Cycle

In some embodiments the aforementioned components are combined into an information product and services life cycle. The life cycle is controlled by aforementioned processes to ensure and guarantee the accuracy, currency, reliability and field usability of data and field applications. The life cycle and processes may be modified to fit the unique requirements of each Project. In this way a wide range of service levels may be supported.

Figure 2:
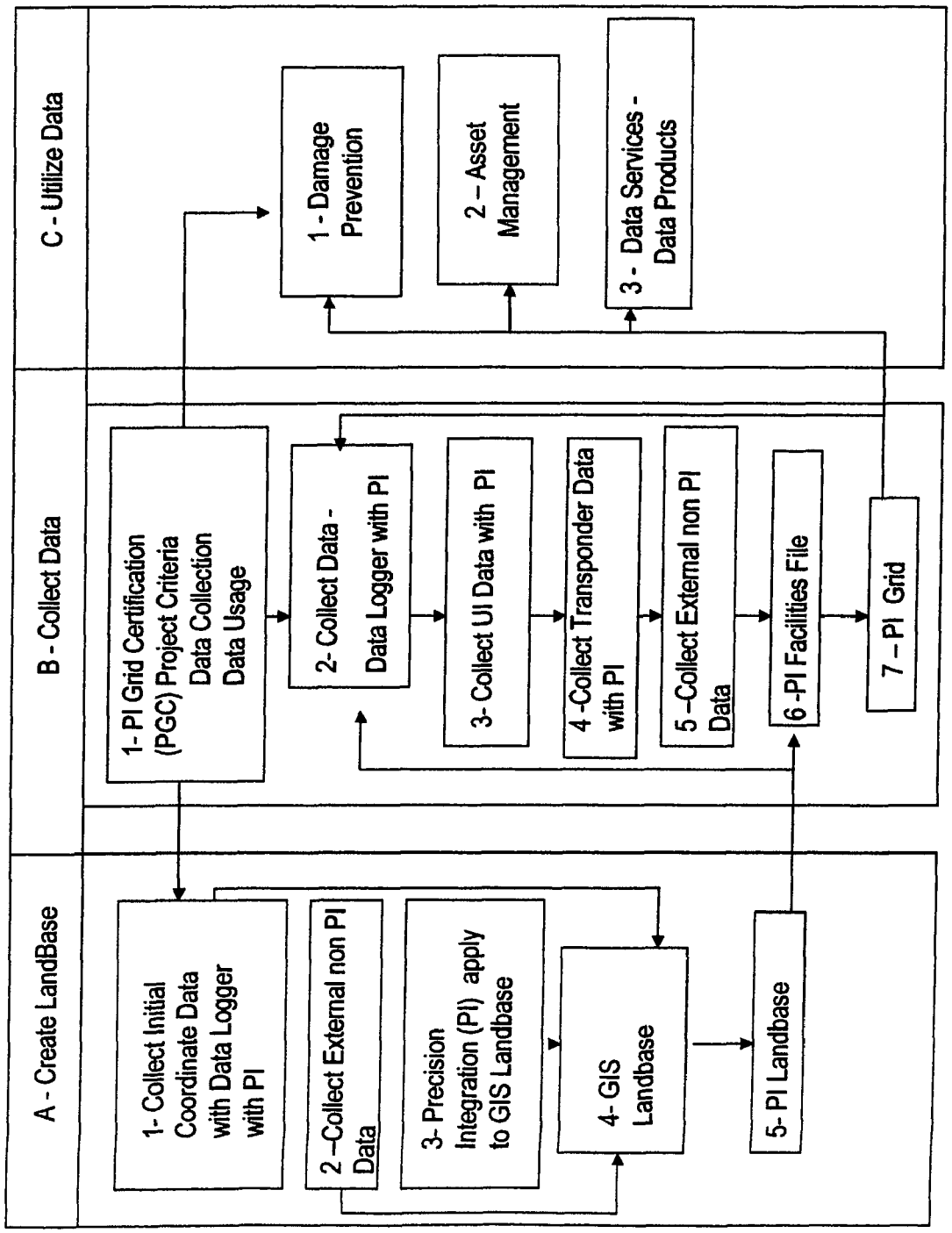
FIG. 2 is a simplified block diagram illustrating one embodiment of a top level life cycle process flow of information and services, in accordance with the invention.

FIG. 2 illustrates an overview of one embodiment of an Information Product Development life cycle. In particular, FIG. 2 illustrates an example of top level information and services flow.

A—Create Landbase. A Data Logger (A-1) is utilized to define and collect initial precise (utilizing PI) data points. External (non PI) data (A-2) including, for example, maps and electronic files may be collected per Project requirements (B-1). PI (Precision Integration) (A-3) is utilized to create a PI Landbase (A-5) utilizing, for example, external data (A-2) with a (A-4) GIS as described by Grid Certification criteria (B-1). Imagery, maps and other GIS Landbase data may be fitted to Precision Data Points creating a Precision Integration (PI) Landbase (A-5).

A PI Landbase may be created in a first step by first going to the project area and collecting initial coordinate data using a data logger referenced to the accurate GPS signal. Precise data points may then be collected in a second step.

B—Collect Data. Data is collected utilizing (B-2) Data Logger, (B-3) UI equipment, (B-4) Transponder input or other input devices. External (non PI) data (B-4) also may be collected. Data collection scheduling and field methods may be defined by (B-1) Grid Certification criteria. Data collected creates a PI Facilities file (B-6) that is merged with PI Landbase (A-5) to create a (B7) PI Grid.

C—Utilize Data. (C-1) Field Application for Damage Prevention (C-1) may utilize (B-7) PI Grid to provide Damage Prevention services and/or Asset Management services (C-2). Data Services (C-3) may provide access to PI Grid (B-7), PI Facilities File (B-6) and other information products.

Major Components

A more detailed description of the six major components follows.

1) PI SW Components—In some embodiment these components are software modules that provide key functionality as follows:
  a) Precision Integration (PI)—PI indicates that the component or process supports or has been developed utilizing PI software or processes. PI software may provide a real time interface to Precision GPS Hardware and Software providing:
    i) Locate Data Functionality—The ability to acquire the position of a utility from Precision GPS Hardware and Software and to capture the precision location information and to integrate this information into a Precision GIS format in real time for immediate use and 'playback' utilizing RTI (real time imaging).
    ii) Locate Position Functionality—The ability to acquire (in real time) the position of Field GPS Hardware (e.g., located on a construction vehicle or being carried by an individual) and to utilize this real time location data for real time display (e.g., using RTI) of the current location of the individual or equipment relative to features and utility locations on a PI map. Location functionality also may be used to determine distances and other critical information between the user and the utility for the purpose of damage prevention activities in the field. PI may be utilized at numerous steps and, in particular, during the collection of data and during the field operations of the Field Applications where real time precision location data is needed for Field Application functionality. PI may assure that data that is collected and utilized is accurate and recallable based on its continuous interface with the Precision GPS cycle during the product and services life cycle.
  b) RTI—Real Time Imagery—RTI may present a project area defined by a PI Landbase or PI Grid as a scrolling map including aerial imagery. RTI may be used to allow for location 'sanity checks' and display the location of the user or construction equipment as there is movement around a project area. RTI may shows (in real-time) data points that are collected, Symbology, meta-data and other relevant application information. RTI may thus facilitate real-time feedback and validation, and by facilitating 'eyes on the ground validation' increases data accuracy significantly. Using RTI, data collectors are able to validate 'where they are' in a project area and to validate that the data they are collecting is the 'correct data'. RTI may utilize PI as a primary input and UGE as primary output.
  c) UGE—Universal Graphics Engine—A graphics engine for rendering and displaying PI Grid data in a standard GIS view format. UGE may be a Scaleable Vector Graphics (SVG) application providing advanced Web based rendering of mapping and other GIS data and may be useable with open architecture viewing products and may provide high flexibility for graphics support of portable devices like PDAs and other portable computing platforms.
  d) SYM-API—Symbology API—SYM-API is an Applications Programming Interface (API) that allows Field Applications to utilize custom, previously developed and/or commercially or privately available vertical market Symbology libraries for attaching Symbols to data points that are collected. For example, such a symbol may define a particular physical feature of a utility.

SYM-API is defined and called by the Field Applications Administration module, as needed, based on the types of data that are being collected during the field session.

e) NTR—Nearest Target Record (NTR)—In some embodiments the NTR is a software application that provides real-time location of utilities versus the location of the user or field equipment, selects the nearest utility or NTR, and provides an algorithm for presenting and warning of the location of this and other utilities based on user defined buffer rules.

Figure 3:
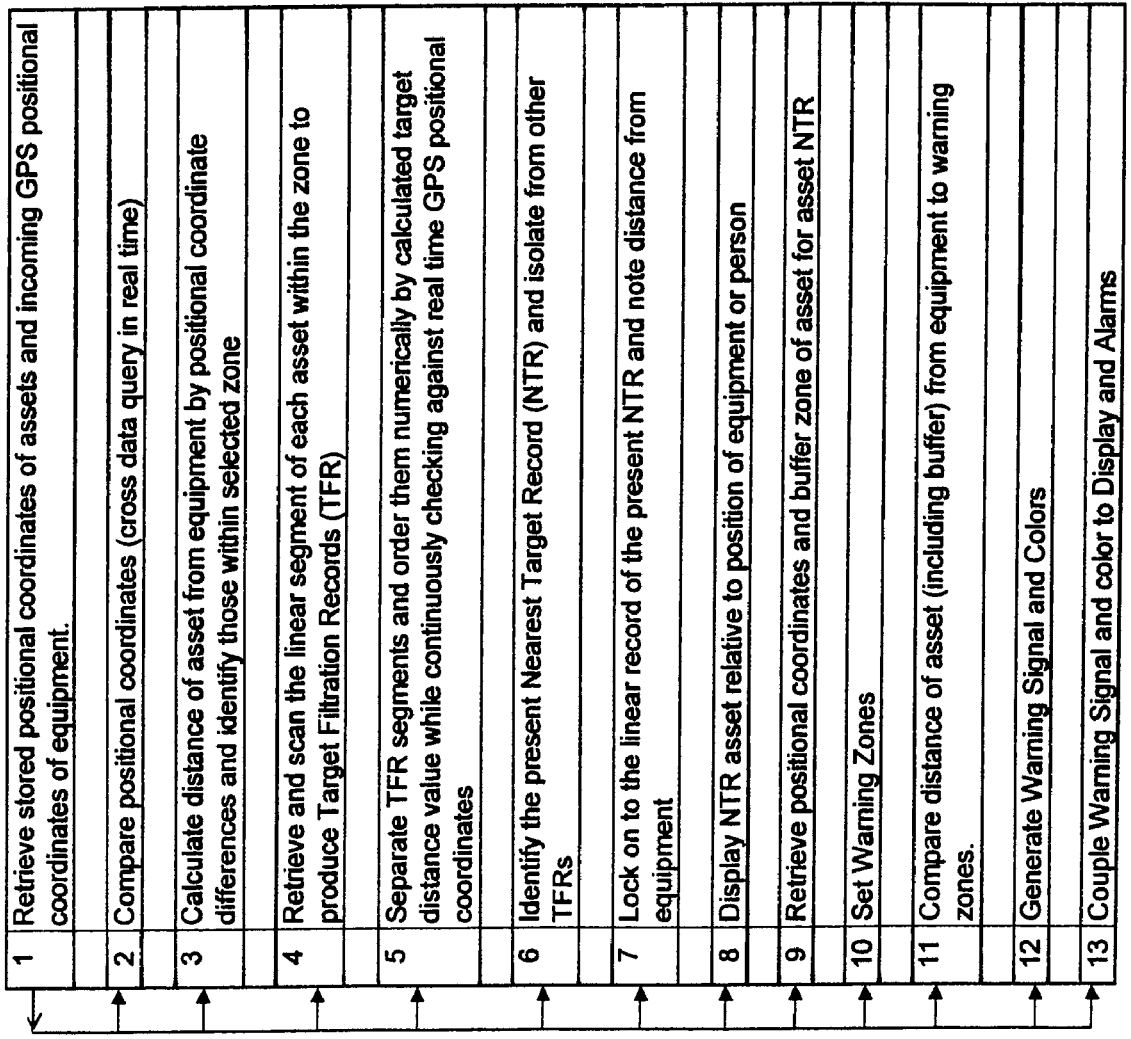
FIG. 3 is a simplified flow chart setting forth one embodiment of logical steps performed by NTR software module functionality in support of Damage Prevention, in accordance with the invention.

FIG. 3 illustrates an overview of one embodiment of NTR functionality. This functionality includes process steps that the NTR software executes to provide Damage Prevention functionality to the DPM Damage Prevention Field Application. These operations are discussed in more detail below.

f) Transponder—Transponder with Asset Data. One approach for creating a permanent record of precise location of assets, such as utility lines underground, is to place transponders on the utility line as it is being placed in the ground. Thereafter, when the location of the utility line is to be recorded, a transponder-on-line reader is moved along the ground to locate the transponders that are on the utility line. As the transponders are read, the position of the transponders, and therefore the utility line, is recorded by the use of an asset position recorder and a precision GPS receiver coupled to the recorder. Examples of placing transponders on utility lines and the later reading of the transponder to produce a record of the location of the transponders and thus the utility line are disclosed in U.S. patent application Ser. No. 10/359,446 filed Feb. 4, 2003, which is assigned to the same Assignee of this application and is incorporated herein by this reference as though set forth in full. The above-described apparatus and method for producing precision asset location data involve the (1) recording of the location during construction while the asset is being placed underground or (2) recording the output of transducers that have been placed on the asset, such as the utility line.

2) GIS/GPS Technologies—Other products and technologies may be integrated into the system or method to provide key functionality.

a) Precision GPS—Today, precision GPS provides location results with a standard of accuracy that supports location of utilities within ten centimeters without RTK and within millimeters when using RTK. Precision GPS is used to deliver three-dimensional fixes and absolute, consistent location resolutions within 10 centimeters or better—anytime, to virtually every region of the planet's surface. Examples of precision GPS receivers that may be used are manufactured and sold by NavCom Inc. of Torrance, Calif. A particularly useful receiver manufactured and sold by NavCom is the Starfire 2050G receiver b) Underground Imaging (UI)—UT utilizes Ground Penetrating Radar (GPR), Electromagnetic Imaging (EMI), CART (Computer Aided Radar Tomography) or other technologies to locate underground utilities. A UI position reader and recorder may be integrated with a precision GPS receiver. The Reader and recorder includes an antenna array for transmitting radar and/or sonar signals into the ground and recording the return signals for locating any assets, such as utility lines, that are underground. This apparatus and method may provide a measurement and record of the depth of the utility as well as the longitudinal and latitudinal coordinates of the location of the utility. Further, the reader and the recorder may determine and record characteristics associated with the utility such as, for example, the size and material of the pipe or conduit of the utility, such as gas pipes, communication lines, water lines and so forth. PI also may be used to integrate the UI data into PI Grids for further field application use.

c) GIS Landbase—Some embodiments utilize, as a starting point, a traditional GIS Landbase consisting of located imagery, infrastructure, such as road, fences, waterways, and other features and other data. One example of a Landbase is provided by Sentinel USA of Newark, Ohio and is known by the trademark Precision LandBASE. Application of PI to a GIS LandBase converts the LandBase into a PI Landbase. A PI LandBase is a GIS LandBase template that is accurate enough to integrate and display precision utility location points to appropriate levels of accuracy for points taken with Precision GPS. Thus process may involve, for example, remapping landmarks or other features from the GIS LandBase with more precise PI location information.

d) Ruggedized Computer—Ruggedized Portable Computer. The host computer for Field Applications including the Data Logger and Damage Prevention Module and Transponder may be a computer modified to include storage media, an input modem for a GPS location device and administrative modules. One example of a lightweight, powerful and rugged computer is the Hammerhead XRT computer, which is available from WalkAbout Computers, Inc. of West Palm Beach, Fla.

3) Field Applications—Software applications that provide key functionality. These applications may be created through systems integration of (1) SW Components and (2) GIS/GPS Technologies. (FIG. 1)

a) Data Logger (DL) A Field Data collection application that integrates, for example, precision GPS, PI, RTI, and UGE with other utility data collection software for the purpose of the collection of Precision data points and utility location data in the field. In some embodiments a Data Logger is an asset position recorder that may be used during construction to record the position of an asset, such as a utility line as it is being placed underground. One example of a data logger is disclosed in U.S. Patent Application Publication No. U.S. 2004/0220731 on May 17, 2005 and assigned to the Assignee of this application, the disclosure of which is incorporated herein by this reference as though set forth in full. The data logger of the referenced published application may be converted to a PI data logger by employing the precision GPS signal and by using the PI Landbase.

Data Logger Functionality

Figure 4:
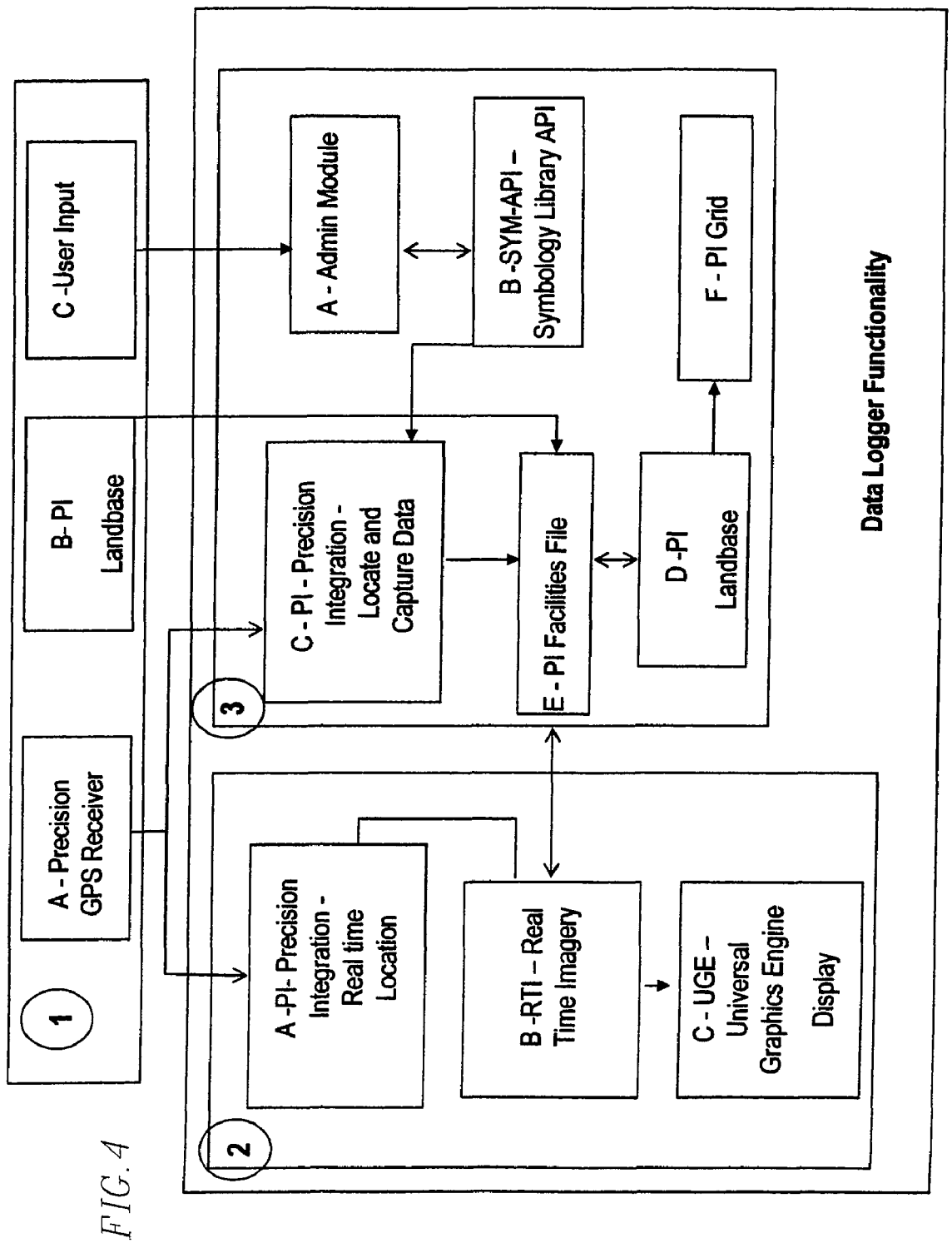
FIG. 4 is a simplified flow chart illustrating one embodiment of components and logical flow of functionality of the field application of the Data Logger Field, in accordance with the invention.

FIG. 4 illustrates one embodiment of a Data Logger apparatus for recording global positioning system coordinates of components of a utility, which includes a portable controller having a memory and a global positioning system (GPS) coordinate device coupled to the controller.

Figure 5:
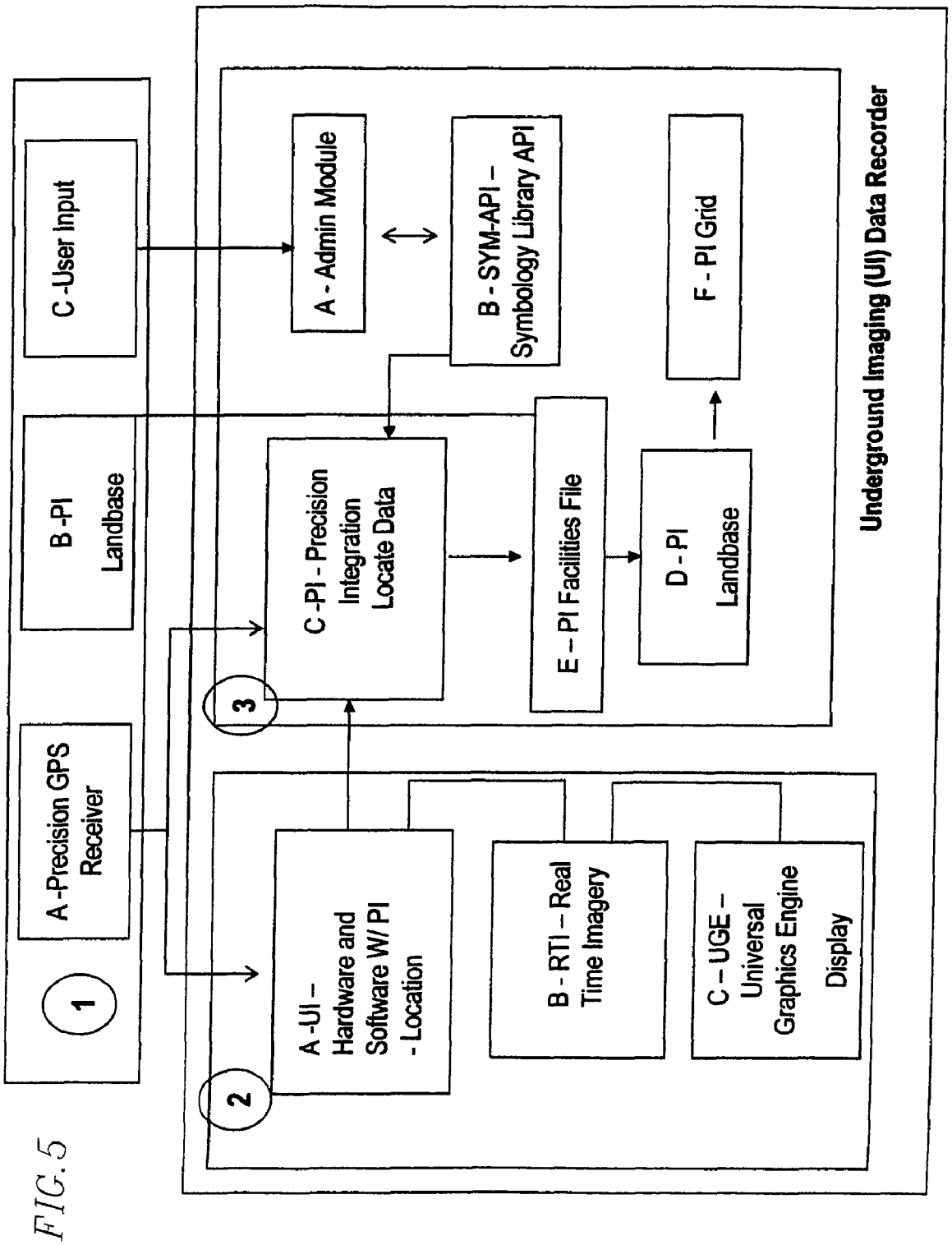
FIG. 5 is a simplified flow chart illustrating one embodiment of components and logical flow of functionality of the field application of the UI Imaging functionality, in accordance with the invention.

Examples of inputs to the Data Logger are shown in Section (1) of FIG. 4. These inputs are (1-A) Precision GPS Receiver Input, (1-B) PI Landbase, and (C-1) User Input. Section 2 shows an example movable map and graphical and other user interface and that may be implemented by the integration of (1-A) Precision GPS signal with (2-A) PI, precision integration (location) with (2B) RTI that is rendered as a user interface utilizing (2-C) UGE. Section 3 demonstrates example data logger functionality. (1-C) User Input provides input to (3-A) Admin module that sets up Field Application parameters including (3-B) SYM-API. (3-C) Precision Integration, Data locate is used in conjunction with (1-A) Precision GPS signal and (3-C) SYM-API to create new utility location database (3-E) a PI Facilities File. (3E) Facilities File and (1B) PI Landbase are presented as movable map using (2B) RTI for real time data collection feedback and verification and are combined to create (3-F) a PI Grid that is the combination of the (1-B) original PI Landbase and the newly (3-E) created Facilities File.

b) Underground Imaging (UI) Data Recorder—A radar/sonar asset position reader and recorder coupled to and controlled by a precision GPS receiver and integrated with Data Logger functionality. The UI Data Recorder combines UI technology with Data Logger functionality resulting in the creation of PI Information Products and functionality that includes data generated by UI technologies and methods UI Data Recorder Functionality FIG. 5 illustrates one embodiment of Underground imaging (UI) Functionality. Examples of inputs to the UI Data Recorder are shown in Section (1) of FIG. 5. These inputs are (1-A) Precision GPS Receiver Input, (1-B) PI Landbase, and (C-1) User Input. Section 2 shows an example movable map and graphical and other user interface that may be implemented by the integration of (1-A) Precision GPS signal with (2-A) UI Hardware and Software with PI, precision integration (location) with (2B) RTI that is rendered as a user interface utilizing (2-C) UGE. Section 3 demonstrates UI example Data Collection functionality. (1-C) User Input provides input to (3-A) Admin module that sets up Field Application parameters including (3-B) SYM-API. (3-C) Precision Integration, Data locate is used in conjunction with (1-A) Precision GPS signal and (2-A) UI Data location inputs and (3-C) SYM-API to create new utility location database (3-E), a PI Facilities File. (3E) Facilities File and (1B) PI Landbase may be combined to create (3-F) a PI Grid.

c) Damage Prevention Module (DPM)—The Damage Prevention application provides field useable utility location and warning capabilities to avoid damage to utilities. In some embodiments the Damage Prevention module utilizes the PI Grid output from the Data Logger, UI Data Collection or the Transponder Recorder applications as the basis for providing Damage Prevention functionality in the field. The Damage Prevention application may be used to warn of critical distances between identified utilities and digging equipment and displays visual and audible alarms. A user may input to the administration module parameters such as the length and reach of the digging equipment and the scale for the warning display. Numerous other parameters may be input to the administration module by the user at the project site. The application may prevent the accidental hitting or damage to assets, such as gas pipelines, by the digging equipment by a filtration process which is set forth by the NTR software module.

Damage Prevention (DPM) Functionality

Figure 6:
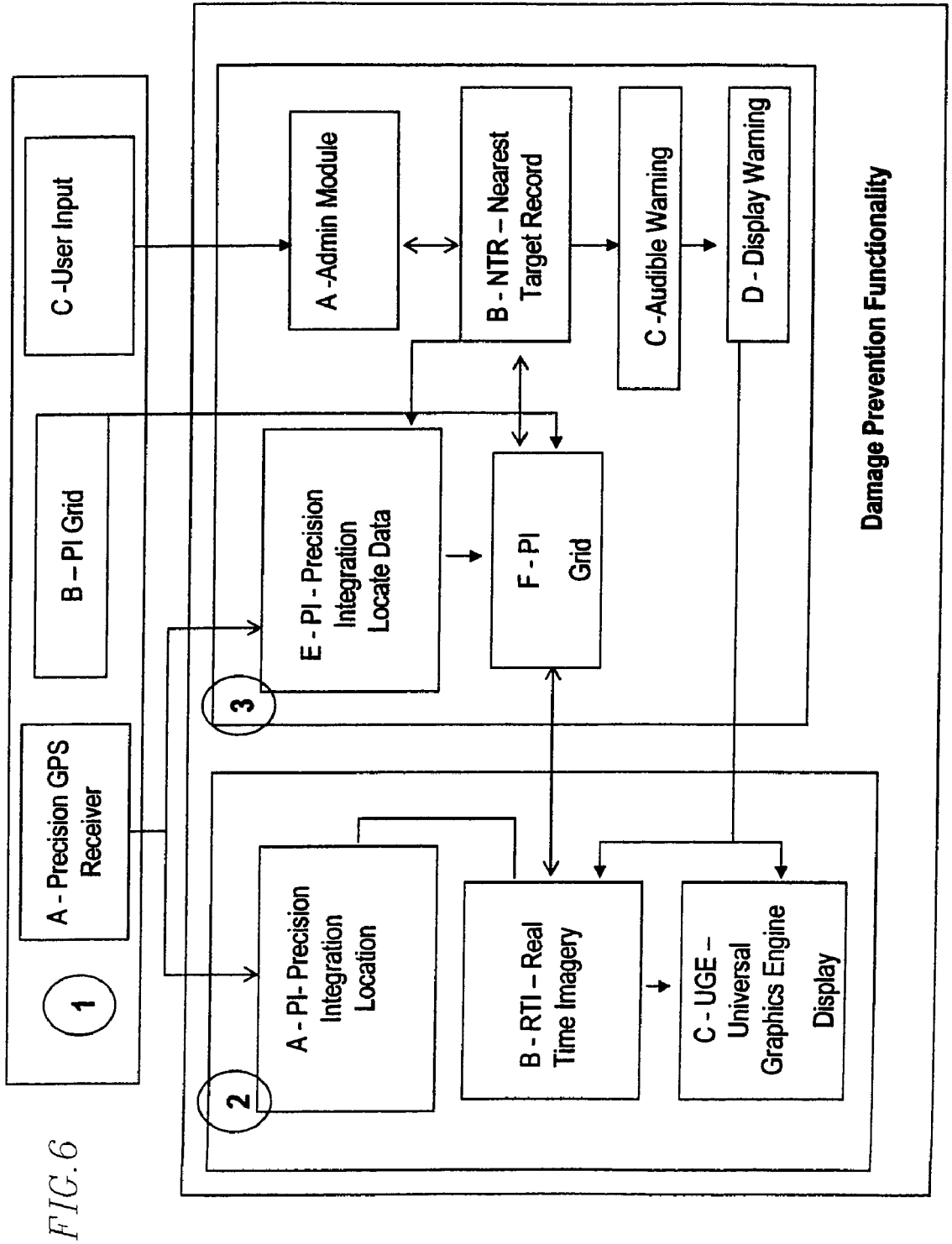
FIG. 6 is a simplified flow chart illustrating one embodiment of components and logical flow of the field application of the Damage Prevention module, in accordance with the invention.

FIG. 6 illustrate one embodiment of Damage Prevention Functionality. Examples of inputs to the Damage Prevention Application (DPM) are shown in Section (1) of FIG. 6. These inputs are (1-A) Precision GPS Receiver Input, (1-B) PI Grid, and (C-1) User Input. Section 2 shows example movable map and graphical and other user interface that may be implemented by the integration of (1-A) Precision GPS signal with (2-A) PI, precision integration (location) with (2B) RTI and (3-F) PI GRID and (3-C) Display Warning that is rendered as a user interface utilizing (2-C) UGE. Section 3 demonstrates example damage prevention functionality. (1-C) User Input provides input to (3-A) Admin module that sets up Field Application parameters and (3-B) NTR damage prevention setup parameters. (3-E) Precision Integration, Data locate is used in conjunction with (1-A) Precision GPS signal and (3-B) NTR and (3-F) PI Grid to implement warning system as a visual display via (2B) RTI and as an audible warning (3-C).

d) Transponder Logger—Transponder Data Logging Field Application. Data Logger capability may be integrated with a transponder-on-line reader that is moved along the ground to locate the transponders that are on the utility line. As the transponders are read, the position of the transponders, and therefore the utility line, is recorded. Transponders may be located via signals that they transmit, and may, also include original precision GPS location data that was collected as they were placed on the utilities.

Transponder Recorder Functionality

Figure 7:
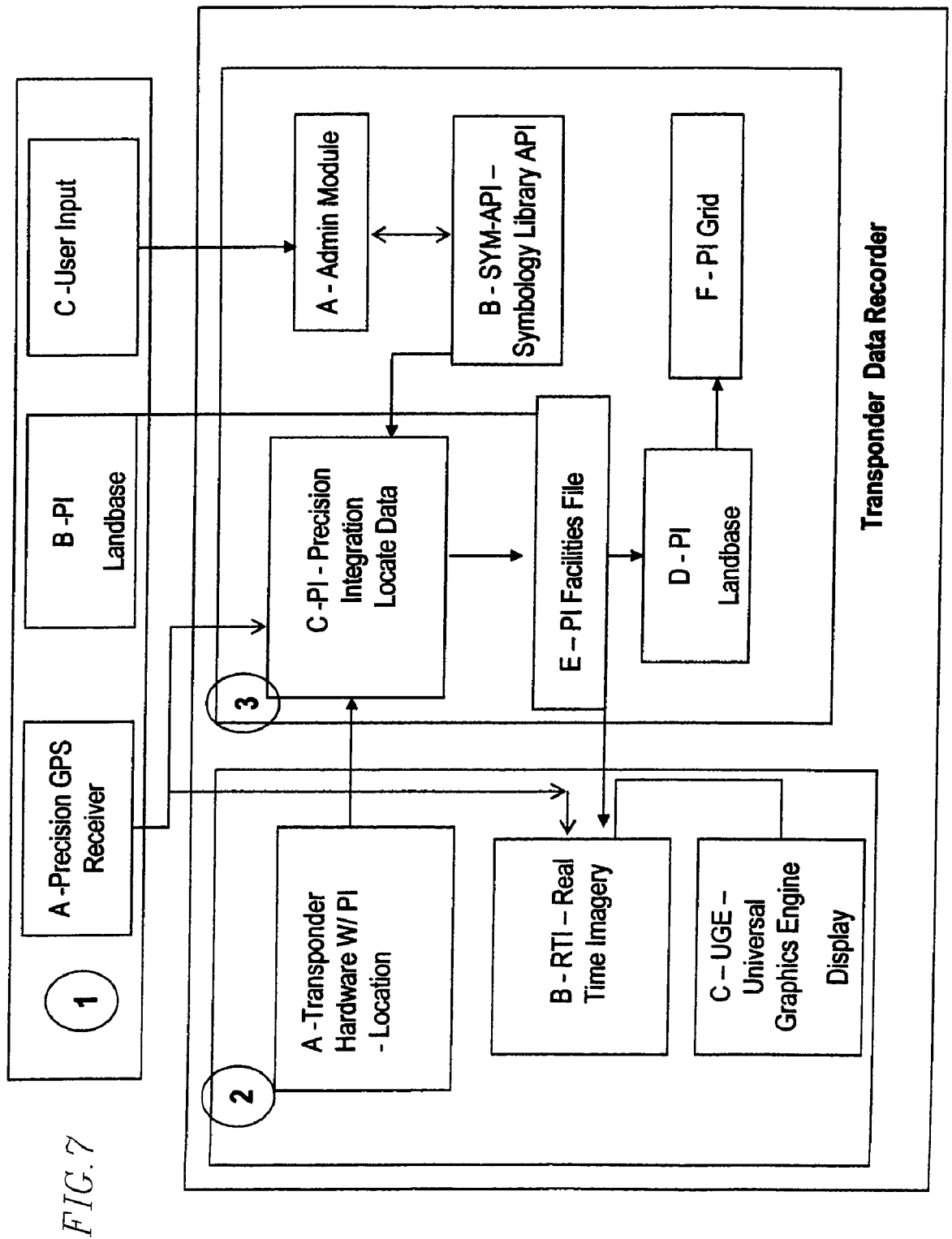
FIG. 7 is a simplified flow chart illustrating one embodiment of components and logical flow of functionality of the field application of the Transponder Logger, in accordance with the invention.

FIG. 7 illustrates one embodiment of Transponder Logger Functionality. Examples of inputs to the Transponder Recorder are shown in Section (1) of FIG. 7. These inputs are (1-A) Precision GPS Receiver Input, (1-B) PI Landbase, and (C-1) User Input. Section 2 shows example movable map and graphical and other user interface that may be implemented by the integration of (1-A) Precision GPS signal with (2B) RTI that is rendered as a user interface utilizing (2-C) UGE. Section 3 demonstrates example Transponder Recorder functionality. (1-C) User Input provides input to (3-A) Admin module that sets up Field Application parameters including (3-B) SYM-API. (3-C) Precision Integration, Data locate is used in conjunction with (2-A) Transponder location and data signal and (3-C) SYM-API to create new utility location database (3-E), a PI Facilities File. (3E) Facilities File and (1B) PI Landbase are presented as movable map using (2B) RTI for real time data collection feedback and verification and are combined to create (3-F) a PI Grid.

4) PI Data Services—Electronic Management and Distribution System (EMDS)—Some embodiments utilize an Electronic Management and Distribution system to manage, store, and distribute information products that are generated. EMDS may provide configuration management and data synchronization services to field applications and may provide subscription based private and public access to information products that are developed. EMDS may be utilized as a key component to the implementation of configuration management and security considerations that are set forth by Project Criteria as described in the Certification processes that are used to guarantee or certify data to be used on various projects.

Figure 8:
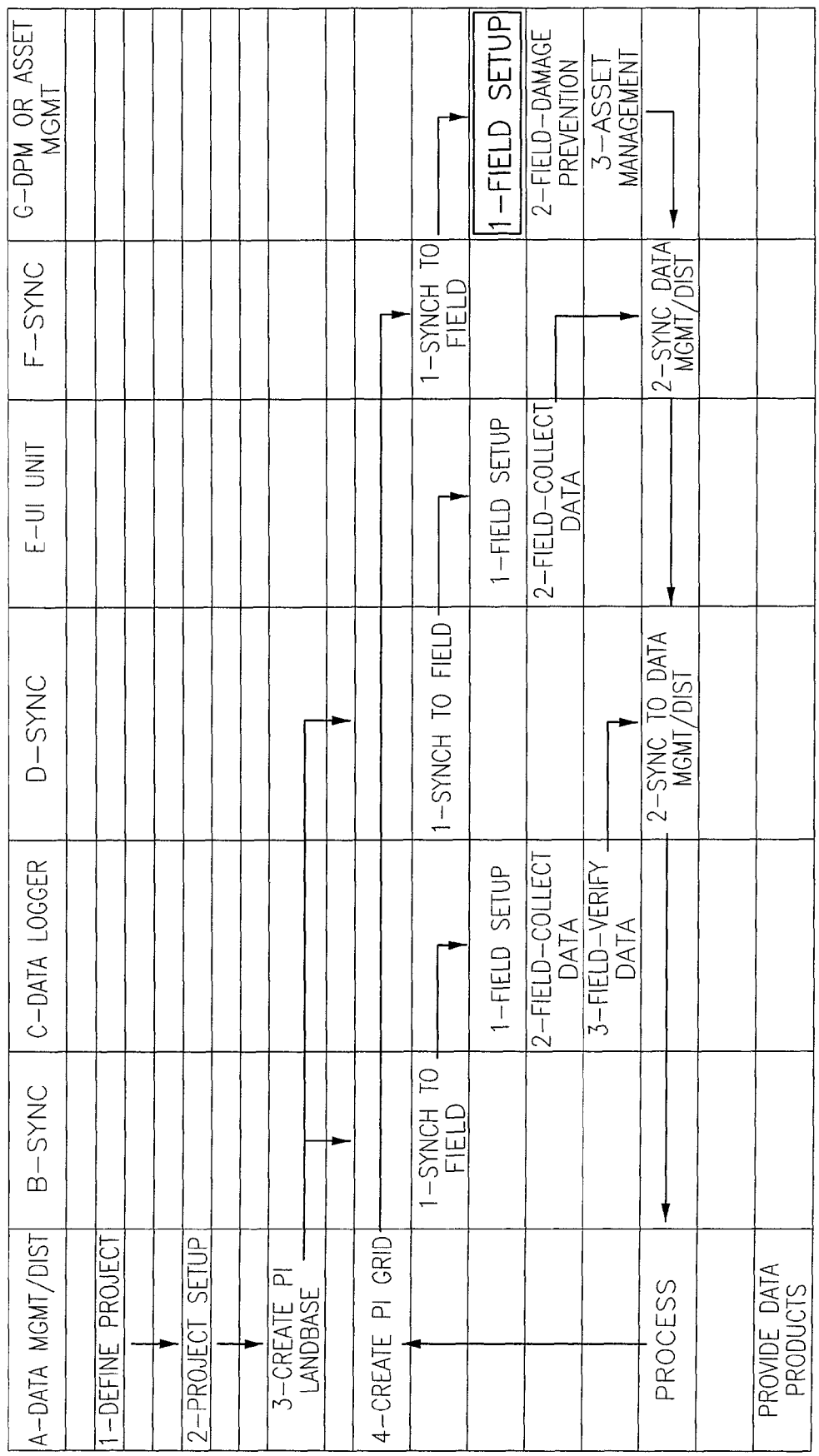
FIG. 8 is a simplified flow diagram illustrating one embodiment of data management and data synchronization of EMDS information product flow, in accordance with the invention.

FIG. 8 illustrates one embodiment of EMDS Data Processing and Field Synchronization Flow. FIG. 8 illustrates the data management and processing flow of EDMS in support of Project data management process criteria. The Project may be defined based on criteria set by the Project Manager and all system parameters for the Project are programmed into the EMDS system. The Initial PI Landbase is stored on the system for distribution to field application computers. SYNC programs download the initial PI Landbase to Data collector applications. Data Collector Applications are further configured in the field then perform data collection tasks. Data collected is SYNC back to EDMS and processed (if necessary) to create a PI Grid. PI Grid data is SYNC back to the field for Damage Prevention Applications. PI Landbase and PI Grid data is provided by EDMS for public or private use on a subscription basis.

The EMDS may serve as a central repository for Information Products that are developed. Data is moved securely from the central repository to the field via the Internet utilizing secure and robust applications like Web Services that are currently provided by the Microsoft Net architecture. Field applications access EMDS via the Internet via wireless transfer methods. All information products are served to users via a Web graphics user interface provided by the Universal Graphics Engine (UGE) which supports graphical displays on a wide variety of viewing devices including portable computers, PDAs and cell phones.

5) Processes—Processes may be invoked or other wise incorporated to certify or guarantee the accuracy and usefulness of Information Products. In some embodiments Processes and Certification Methods (Certification) are used to validate and certify that utility location data meets accuracy, completeness and usability standards. A Project Manager that is depending on PI based Damage Prevention Services may seek assurance that the PI Grid data is accurate, complete, up to date and applicable to the Project to a standard that provides a high degree of confidence that utility damages will be avoided if the system is utilized to identify the location of potential utility conflicts. Certification may answer the following questions for the Project Manager and give the Project Manager a confidence level at which he or she can utilize the data to take actions in the field:
   a) Is the Project Area correctly defined? Do I have all the data I need to support the Project?
   b) Is utility positional data correct? To what degree (distance from actual utility location) is it correct?
   c) How current is the Data? Have any utilities or other construction been put in the ground since the utility locations were collected?
   d) Who developed the data and when?
   e) How complete is the data? Was data collected and verified in conjunction with planned Project utility activities (pot holing, as-built) at the project site?
   f) Have significant or dangerous utilities (gas lines) been specifically called out?
   g) Have personnel on the site (equipment operators, supervisors, data collectors) been trained and certified in the use of the equipment?

Figure 9:
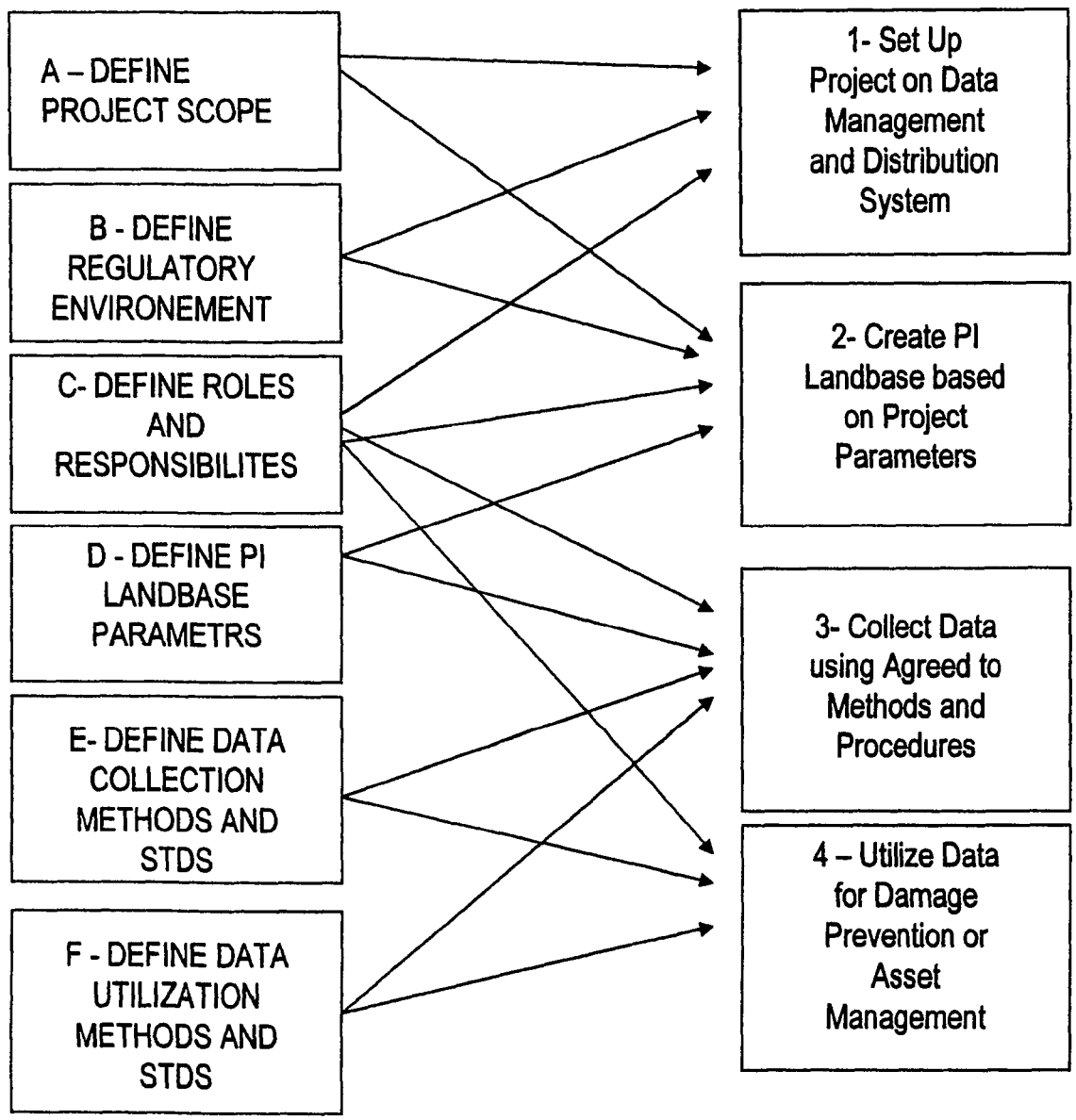
FIG. 9 is a simplified flow diagram illustrating one embodiment of a relationship between the Certification Process and major life cycle steps, in accordance with the invention.

FIG. 9 illustrates one embodiment of Certification and Management Processes. FIG. 9 illustrates that a Certification Process may provide a management and operational framework to support a Project. At each step of the process of creating information products or utilizing field applications, Project Criteria are followed to ensure the integrity and applicability and usability of the data in support of the particular requirements of each project. In some embodiments Process and Certification may involve the following steps:
1) Define Project—Set Project Criteria and Data Collection Plan
   a) Define PROJECT SCOPE (SUE, FAA, Utility)
      i) Regulatory environment—What rules, regulations, laws, constraints, measures apply to this Project
      ii) Data Access and Usage, Who has access to What data, When
      iii) Define PROJECT GRID—Area within which project will be performed
   b) Define PI LANDBASE FEATURE SET
      i) GIS Data, Projections Datum etc.
      ii) Images—Source, Currency, Resolution
      iii) Other Maps—Source, Configuration, Detail
      iv) Other Data Sources—File Format
      v) Define Error correction criteria for imported data (maps and other GIS data)
   c) Define UTILITY DATA GATHERING PROCESS
      i) Roles and Responsibilities (Project Manager Field Mgmt, GPS Field Services, Data Logging Company, UI Company)
      ii) Define Types and Sequence of Data Gathering (PI Locates, PI Potholes, PI As Built, Pi UI
      iii) Quantify Number of Data Gathering Sweeps—Number of iterations of each type of data gathering
   d) Define PI GRID CRITERIA
      i) Define Data UPDATE and Configuration Management BUSINESS RULES
      ii) AGREE ON CRITERIA FOR ACCEPTANCE OF PI GRID (approved use of data set for Damage Prevention
   e) Define CERTIFICATION Training CRITERIA (training required for Data Gathering and Use of Damage Prevention)
2) Create PI Landbase
   a) BUILD PROJECT PI LANDBASE
      i) Identify Project Grid Area with PI Grid SYSTEM
      ii) Field Gather Precision Grid Locate Points
      iii) Acquire Imagery based on Project Criteria
      iv) Acquire Maps and other Data Inputs based on Project Criteria
      v) Implement Precision placement (rubber sheeting etc.) of all input data
      vi) RELEASE PI LANDBASE (Release to Project based on Project Criteria)
      vii) ACCEPT PI LANDBASE (Project Manager Reviews and Accepts Precision Landbase)
3) Collect Utility Location Data
   a) COLLECT UTILITY DATA—Certified FIELD UNITS
      i) SET UP PROJECT on Field Application (Set up Field Unique Profiles (i.e. TYPE of Collection (Locates, As Built etc.) Symbology Set, User etc.)
      ii) COLLECT DATA in Field Utilizing Data Logger Application
      iii) Validate Field Data Collection Utilizing Data Logger View Application
      iv) SYNCH—(UPLOAD) Field Data to Data Services Server
   b) REPEAT PROCESS AS REQUIRED BY PROJECT REQUIREMENTS
   c) COLLECT UTILITY DATA—3RD PARTY UI DEVICES
      i) SET UP PROJECT on Field Application (Set up Field Unique Profiles (i.e. TYPE of Collection (Locates, As Built etc.) Symbology Set, User etc.)
      ii) COLLECT DATA in Field Utilizing 3RD PARTY DEVICE
      iii) PROVIDE RAW DATA TO POST PROCESSING CONTRACTOR
      iv) 3rd Party Data is Post Processed and ADDED TO PROJECT GRID ON Data Services Server
      v) SYNCH—(DOWNLOAD) FIELD DATA INCLUDING 3RD PARTY DATA to Data Services Server
      vi) REPEAT PROCESS AS REQUIRED BY PROJECT REQUIREMENTS
4) Utilize Data for Project Purposes (Damage Prevention, Asset Management)
   a) CERTIFY PI GRID (Validate with Project Manager that Data may be used for Damage Prevention)
      i) Project Manager—REVIEWS, ACCEPTS AND CERTIFIES that Grid may be used for Damage Prevention on Project
      ii) CERTIFY—(MARK) PROJECT GRID AS A PI GRID on Data Services
   b) PROVIDE GUARDIAN PROSTAR DATA SERVICES
      i) Damage Prevention Services
      ii) Utility Asset Management Services
6) Information Products—Information Products may be produced through the use of Field Applications and PI Processes. Information Products may be managed and distributed through their life cycle by Data Services supported by the EMDS platform. Data products are developed during the lifecycle of a Project. Customers will have access to and usage of information products based on parameters set for each Project. Information Products are created from informational 'building blocks' during the life cycle of a Project. For example, a PI Grid, which may be the most comprehensive Information Product, may be built from a GIS Landbase, that is improved into a PI Landbase to which utility location information (in the form of a PI Facilities File) is added to produce a PI Grid. In some embodiments the PI Grid is the only information product that may be certified for use for Damage Prevention and must be created utilizing Project processes and parameters that result in Certification of the PI Grid for this type of use.

Figure 10:
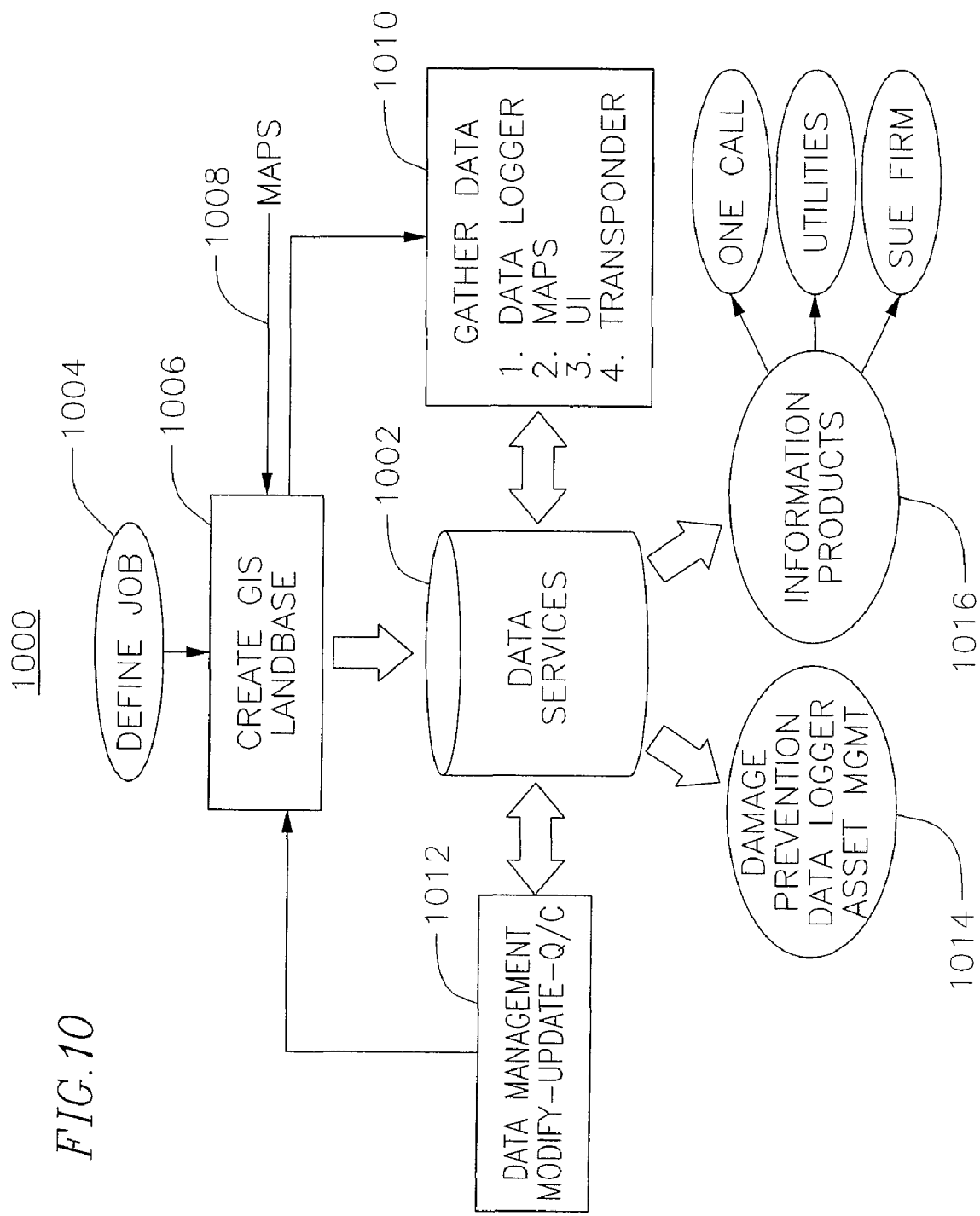
FIG. 10 is a simplified flow diagram illustrating one embodiment of top level development and information usage flow for Information Products, in accordance with the invention.

With the above operations in mind, FIG. 10 illustrates an overview of one embodiment of a management system 1000 constructed in accordance with the invention. These operations may be performed in conjunction with various data services 1002 as discussed herein. Initially, a project (job) is defined a block 1004. Next, a GIS Landbase is created (block 1006) utilizing map data 1008. Data is gathered (block 1010) using, for example, one or more data logger, map, UI and transponder devices. Data management operations (block 1012) may be invoked to manage one or more of the databases. A precision database may then be used for damage prevention, data logging and asset management operations (block 1014). For example, asset management operations may include using a facility file or similar information to identify, characterize or track an asset. In addition, various information products (block 1016) may be defined as discussed herein.

Referring now to FIGS. 11-14, one embodiment of a damage prevention system will be discussed. The damage prevention system consists of three parts; two of which may be housed in the same housing. The three parts are apparatus and method for collecting data, apparatus and method for manipulating the data to put it into a standardized form and the apparatus and method for using the data on equipment to prevent damage by the equipment or to minimize damage to the equipment Precision [within 10 centimeters, without using real-time kinetics (RTK), and within millimeter accuracy using RTK] asset location data may be created by the apparatus and method of this invention. In particular, there is shown in Fig. A of FIG. 11 an apparatus and method that provides a precision location of the asset, such as a utility line, as it is being placed in the earth. A permanent record of this precision location is based on latitudinal and longitudinal coordinates that are stored for later use. A precision GPS receiver 10 provides the precise latitudinal and longitudinal coordinates for the asset position recorder 11 while the utility line is being placed in the ground. Precision GPS receivers that may be useful in this invention are manufactured and sold by Nav-Com Inc. of Torrance, Calif. A particularly useful receiver manufactured and sold by NavCom is the Starfire 2050G receiver. An asset position recorder II that may be used during construction to record the position of an asset, such as a utility line as it is being placed underground, is disclosed in U.S. patent application Ser. No. 10/714,091 filed Nov. 13, 2003 and assigned to the same Assignee as this application. The disclosure of this application is incorporated herein as though set forth in full.

Figure 11:
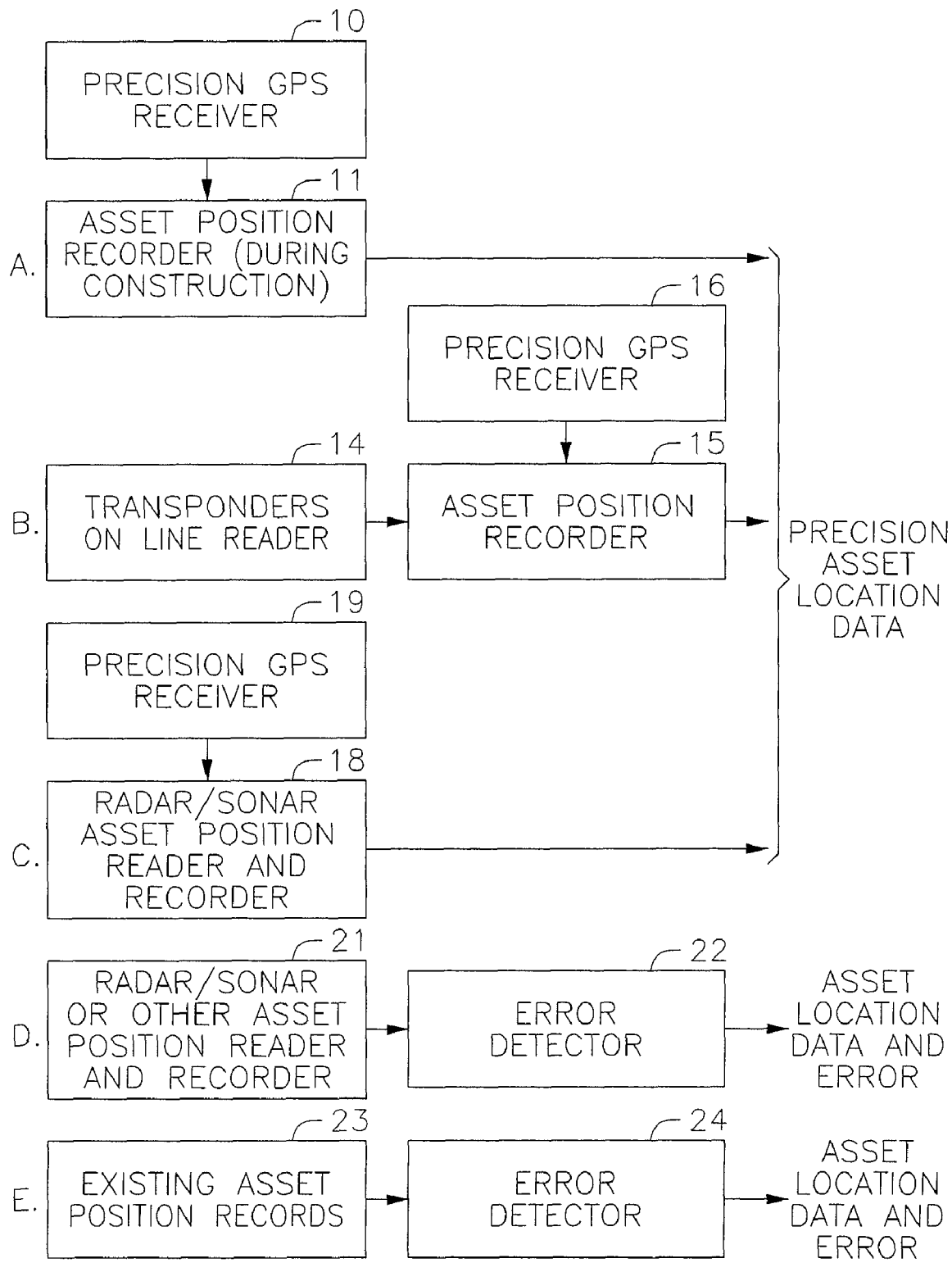
FIG. 11 is a simplified flow diagram illustrating one embodiment of data collection, in accordance with the invention.

Another approach for creating a permanent record of the precise location of assets, such as utility lines underground, is shown in Fig. B of FIG. 11. In this approach transponders are placed on the utility line as it is being placed in the ground. Thereafter, when the location of the utility line is to be recorded, a transponder-on-line reader 14 is moved along the ground to locate the transponders that are on the utility line. As the transponders are read, the position of the transponders, and therefore the utility line, is recorded by the use of an asset position recorder 15 and a precision GPS receiver 16 that is coupled to the recorder 15. The precision GPS receiver 16 may be the same receiver as the GPS receiver 10 of Fig. A. The output of the asset position recorder 15 is an ASCII stream having fields for the latitudinal coordinates, the longitudinal coordinates and the identification of the underground asset. The placing of transponders on utility lines and the later reading of the transponder to produce a record of the location of the transponders and thus the utility line are disclosed in U.S. patent application Ser. No. 10/359,446 filed Feb. 4, 2003, which is assigned to the same Assignee of this application. The disclosure of the Application is incorporated herein by this reference as though set forth in full.

The two above-described apparatus and method for producing precision asset location data involve the recording of the location during construction while the asset is being placed underground or recording the output of transducers that have been placed on the asset, such as the utility line. Many areas do not have any information as to the location of assets such as utility lines that are underground in the area. An effective way of determining the location of such assets and permanently recording the location for later use is the apparatus that is shown in Fig. C of FIG. 11. This apparatus includes a radar/sonar asset position reader and recorder 18 coupled to and controlled by a precision GPS receiver 19. This GPS receiver 19 may be the same as the GPS receiver 10 of Fig. A. Reader and recorder 18 includes an antenna array for transmitting radar and sonar signals into the ground and recording the return signals for locating any assets, such as utility lines, that are underground. This apparatus and method provides a measurement and record of the depth of the utility as well as the longitudinal and latitudinal coordinates of the location of the utility. Further, the reader and the recorder 18 determines and records the size and material of the pipe or conduit of the utility, such as gas pipes, communication lines, water lines and so forth. The output of the reader and recorder 18 is an ASCII stream with fields for the longitudinal coordinate, latitudinal coordinate and identification of the asset or utility that is underground at the precise location.

There are various devices for locating utilities and recording the location of these utilities such as radar/sonar readers and ground penetrating radar readers. However, it has been found that the records created by these readers may have the location of the underground asset or facility as much as 15 feet away from the actual location. Thus, if this information is to be used in a precision damage control system, it is necessary to determine the extent of error and correct for this error when the data is employed. Apparatus for employing the records of earlier readers and recorders 21 is shown in Fig. D of FIG. 11. The output of the reader and recorder 21 passes through an error detector which develops an error correction signal that is coupled to the data and is used in correcting the location of the asset when the data is employed in a damage control system. Further, there are some existing asset position records that have been created when the utility or asset has been placed in the ground. It has been found that these records also are not accurate in the location of the asset. Consequently, the difference between recorded location and actual location must be determined as shown in Fig. F. of FIG. 11. An error detector 24 is coupled to the output of existing asset position records medium 23 for developing an error correction signal to be coupled to the data for use by a damage control system.

Data Manipulation

Figure 12:
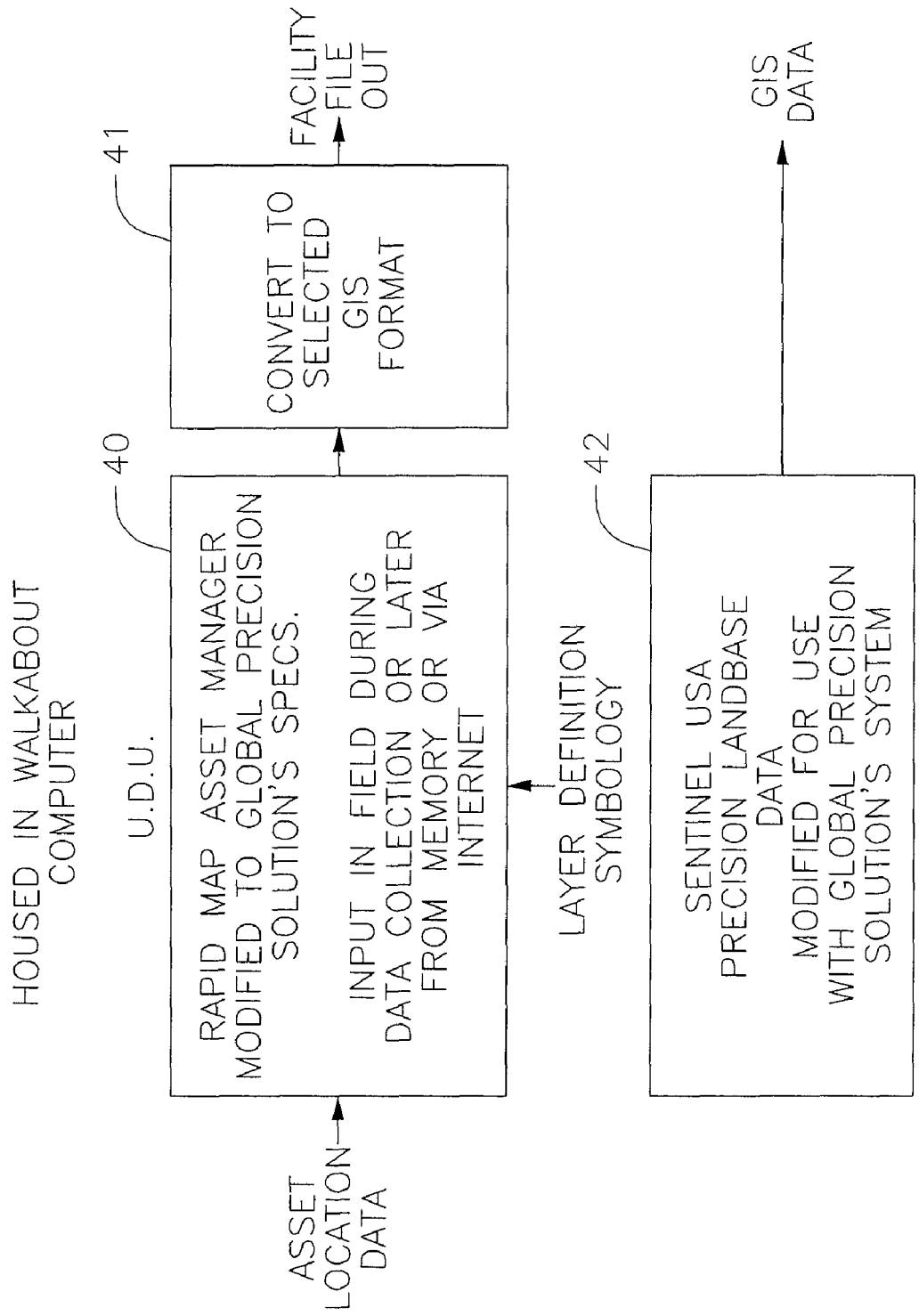
FIG. 12 is a simplified schematic block diagram of one embodiment of data manipulation, in accordance with the invention.

The asset location data at the output of the apparatus of FIG. 11 is coupled as the input to a utility designating unit 40 shown in FIG. 12. The utility designating unit 40 may be located in the field and employed at the same time as the precision asset location data is being read and recorded by the various apparatuses 11, 14, and 18 shown in Figs. A, B and C of FIG. 11. The precision asset location data that is in the form of ASCII codes in designated fields has ASCII fields added in unit 40 to identify the type of utility employing symbology information from a library. A layer definition field is also added based on the type of utility that has been identified. For example, a gas pipeline is a very dangerous utility to cut into in the field while digging in the field. Consequently, gas lines are identified at a higher level than other utilities and have a greater buffer zone around the line to prevent the accidental hitting of the line in the field. The output of the utility designating unit 40 is coupled to a converter 41 that converts the data stream into a geographical information system (GIS) format. There are several major or standard formats including, for example, Autodesk, ESRI, Intergraph, GE Small World, and MapInfo. The GIS format is selected on the basis of the subsequent use of the data by a damage control unit. In addition to the information concerning the asset or utility, it is often times desirable to have the infrastructure, such as road, fences, waterways, and so forth, that are in the area mapped on a display that is being used for displaying the location of the assets. A location of the infrastructure in the GIS data should be as precise as the location of the utilities from the precise asset location data. Such precise 015 data is provided by SentinelUSA of Newark, Ohio and is known by the trademark Precision LandBASE Data. The file of such data is contained in the memory 42 shown in FIG. 12.

The utility designating unit 40 may also have input from the readers and recorders 21 and 23 of Figs. D and E of FIG. 11. In this case, the asset location data will also include the error compensation signal at the output of error detectors 22 and 24. This error signal is used by the utility designating unit 40 to provide an additional buffer or area around the utility based on the degree of error that is shown by the error correction signal.

Data Usage

There are two types of equipment that may use the data that is provided by the utility designating unit 40 and converter 41 at a work area where the location of assets, need to be known to prevent damage to the asset and/or the equipment at the work area. One type of equipment is that used in breaking ground near above-ground assets and near underground assets. Another type of equipment that may use the data is emergency equipment, such as fire fighting equipment, where it is useful to know the location of the various utilities, such as power lines and gas lines. The use of the data will be described in connection with digging equipment at a site.

The asset location data in the form of a facility file at the output of the converter 41 is provided to a control unit 50 (FIG. 3) that is positioned on the digging equipment (not shown) at the project site. The control unit or controller 50 may be a computer modified to include storage media, an input modem for a GPS location device and administrative modules. One acceptable lightweight, powerful and rugged computer is the Hammerhead XRT computer, which is available from WalkAbout Computers, Inc. of West Palm Beach, Fla.

The facility file may be provided by a direct coupling between the converter 41 and the controller 50 on the digging equipment. In this case the asset location data is provided to the utility designating unit 40 on the digging equipment by a memory device or by an Internet coupling or line coupling to a location where the asset location data is stored. Alternatively to the direct coupling, the facility file data may be provided on a memory medium to the controller 50 or may be transmitted to the controller 50 by way of the internet, wireless communication, or direct coupling by line to a facility where the facility file is stored for the particular project site. The controller 50 includes a facility file memory 51 and a GIS file memory 52. The controller 50 further includes a microprocessor and memory 53 that includes software for performing a unique filtration process that identifies the utilities and/or protected areas that are within the selected range of the equipment at the project site. The equipment (digger) is represented by an input modem 54 that provides the OPS location of the equipment at the project site. The OPS location of the equipment is determined by a precision GPS receiver 60 that provides its input to the controller 50 through the modem or GPS equipment location block 54.

Figure 13:
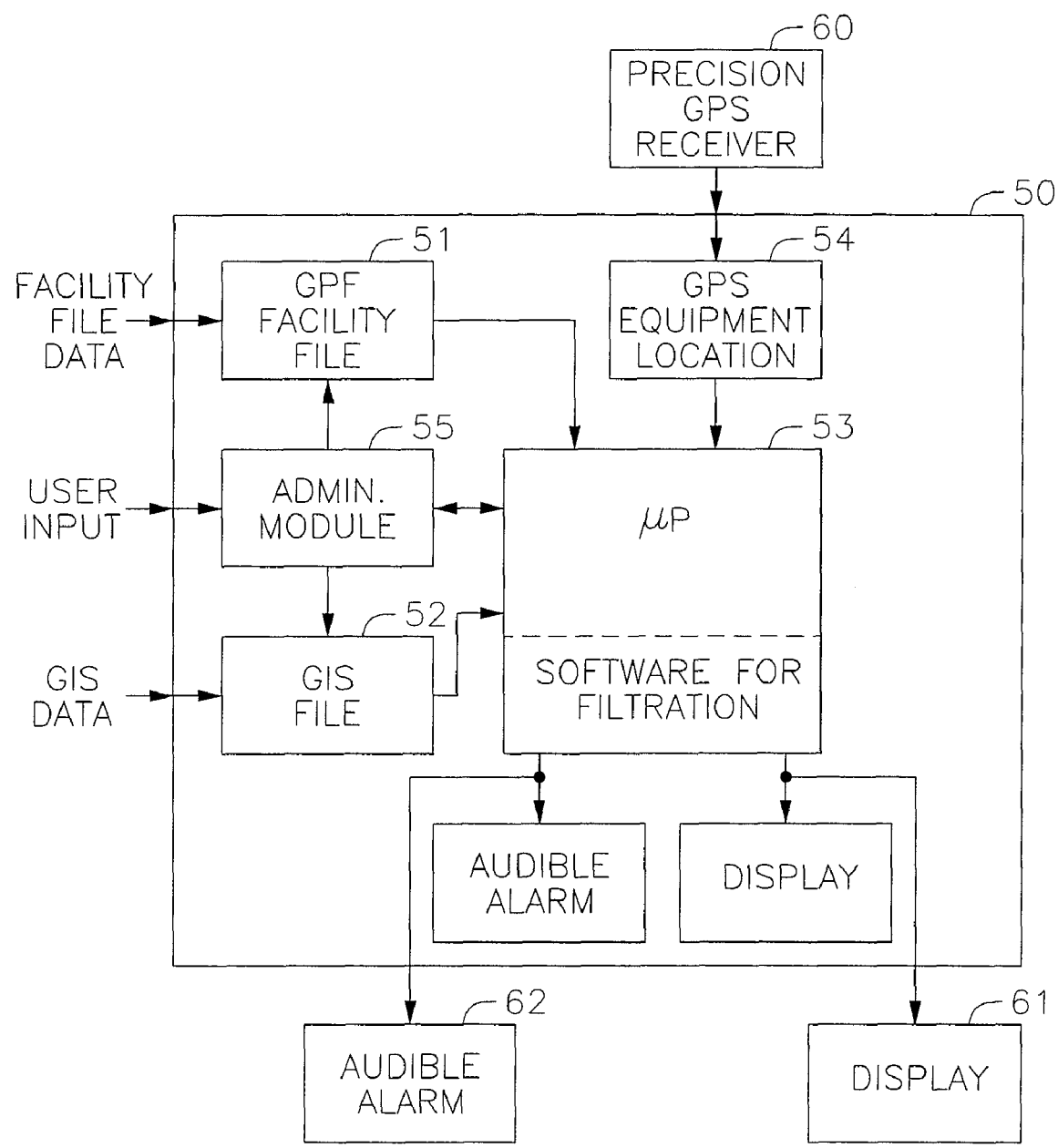
FIG. 13 is a simplified schematic block diagram of one embodiment of data usage, in accordance with the invention.
Figure 14:
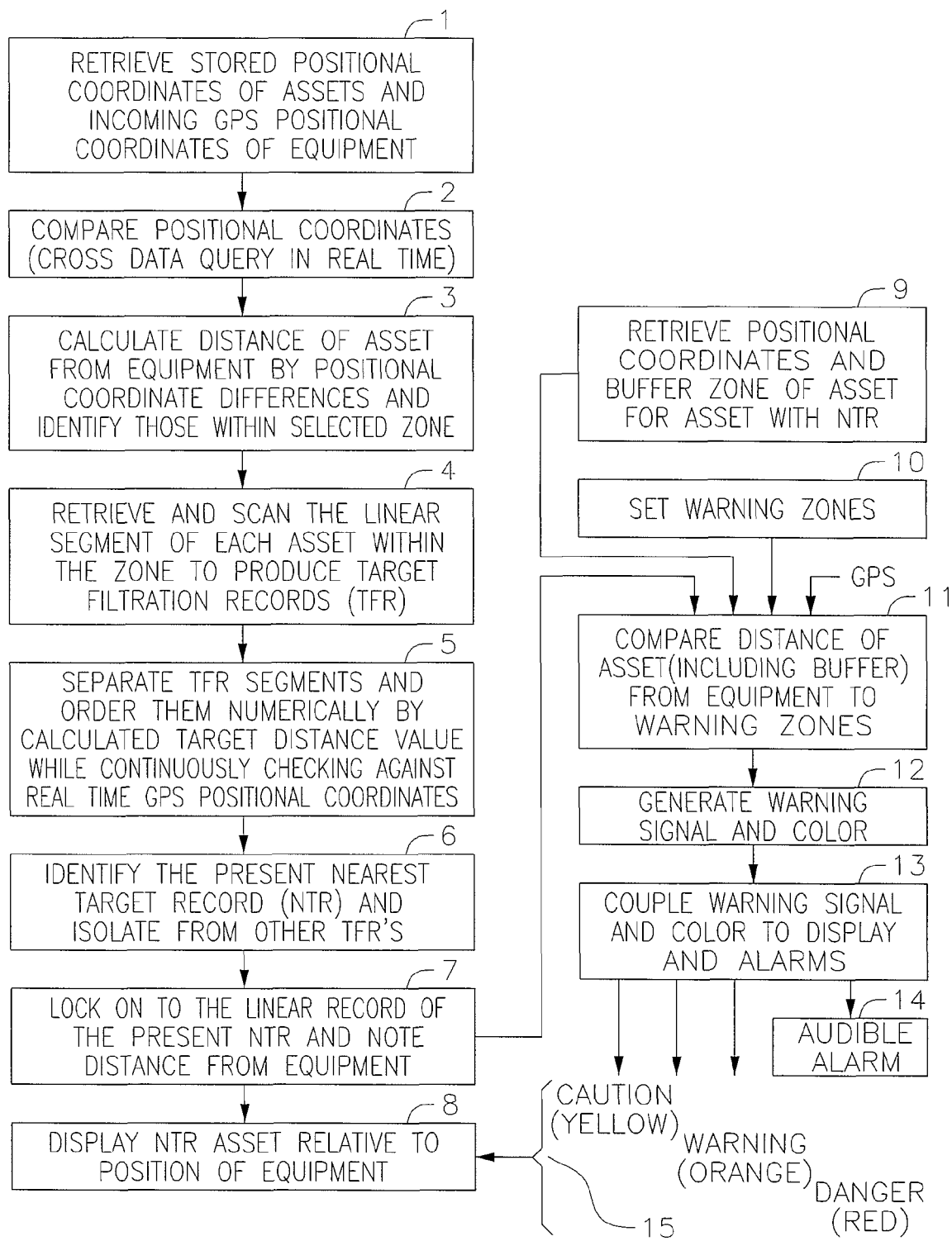
FIG. 14 is a simplified flow diagram of one embodiment of NTR, in accordance with the invention.

An administration module 55 is provided in the controller 50 so that the user of the controller 50 may input control signals for the digger at the particular project site. These control signals include critical distances between identified utilities and the digging equipment for displaying alarms and for also causing audible alarms. The administration module 55 also requires a password to be entered for the user to log into the controller 50 for use at the project location. The user also inputs to the administration module 55 parameters such as the size and reach of the digging equipment and the scale for the display on the display 61. Numerous other parameters may be input to the administration module by the user at the project site The apparatus at the project site also includes an audible alarm 62 which may be internal of the controller 50 or external of the controller 50 as shown in FIG. 13.

The microprocessor 53 of the controller 50 scans the data in the facility file 51 and displays all utilities within a selected range of the digging equipment. The selected range may be 100 feet or 1000 feet, for example. The controller 50 prevents the accidental hitting or damage to assets, such as gas pipelines, by the digging equipment by a unique filtration process which is set forth as a flow chart in FIG. 14. In Step 1 the software for filtration, which is part of the microprocessor 53, retrieves stored positional coordinates of assets and incoming GPS positional coordinates of the digging equipment. In Step 2 the filtration process compares the positional coordinates; that is, performs a cross data query in real time between the positional coordinates of the assets and the incoming GPS positional coordinates of the digging equipment. Step 3 of the filtration process includes the calculation of the distance of the assets from the equipment by the positional coordinate differences and identifies those within selected zones. The selected zones may be 10 ft., 20 ft. or 30 ft. from the digging equipment for example. In Step 4 of the process the software retrieves and scans the linear segments of each asset's data stream of the asset within the selected zone to produce target filtration records (TFR). In Step S of the process the software separates the target filtration record segments and orders them numerically by a calculated target distance value while continuously checking against the real time GPS positional coordinates. In Step 6 of the process the software identifies the present nearest target record NTR) and isolates this record from the other TFRs. In step 7 of the process, the software locks onto the linear record of the present nearest target record and notes the distance of this asset from the digging equipment. In Step 8, the software displays the nearest target record asset's position relative to the position of the digging equipment on the display 61. While the nearest target record asset is being displayed on the display 61, the buffer distance for the identified asset is used. In Step 9 the process retrieves the positional coordinates and the buffer zone of the asset that has been identified as the nearest target record. In Step 10, the warning zone for the particular asset is retrieved and is an input as part of Step 11. In Step 11, the distance of the asset that has been identified with the nearest target records including the assets buffer zone, from the digging equipment is determined and compared to warning zones. In Step 12 of the process warning signals and colors are generated. In Step 13 the warning signal and color are coupled to the display 61 and to the audible alarm 62. In one embodiment the asset on the display is displayed with a flashing yellow to indicate that the asset is within the designated range for caution. As the relative distance between the asset and digging equipment decreases, the display changes to orange to inform the user that it is in the warning zone. As the distance reaches a critical point of danger, the location of the asset is indicated in a flashing red and the audible alarm signal in step 14 is created and the alarm is sounded in the audible alarm 62. For critical assets such as high pressure gas lines, when the relative distance between the asset and the digging equipment reaches the danger zone, and depending upon the system settings, the digging equipment can be automatically disabled so that no further digging may take place and there will be no damage to the asset and also to the equipment and equipment operator.

Figure 15:
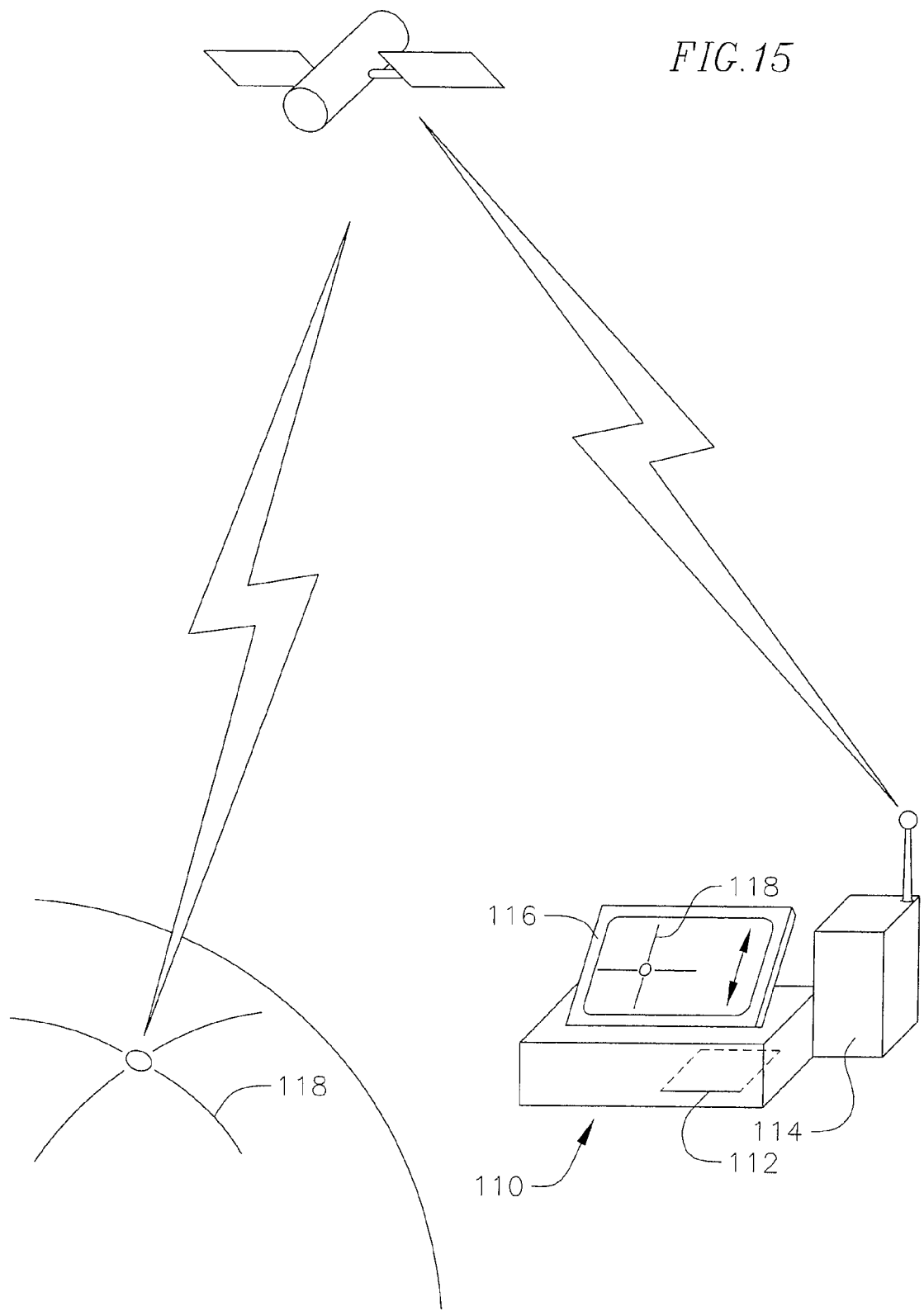
FIG. 15 is a simplified perspective view of one embodiment of system components used in a method of dynamically tracking a location of one or more selected utilities as a movement occurs within a municipal service area, in accordance with the invention.
Figure 16:
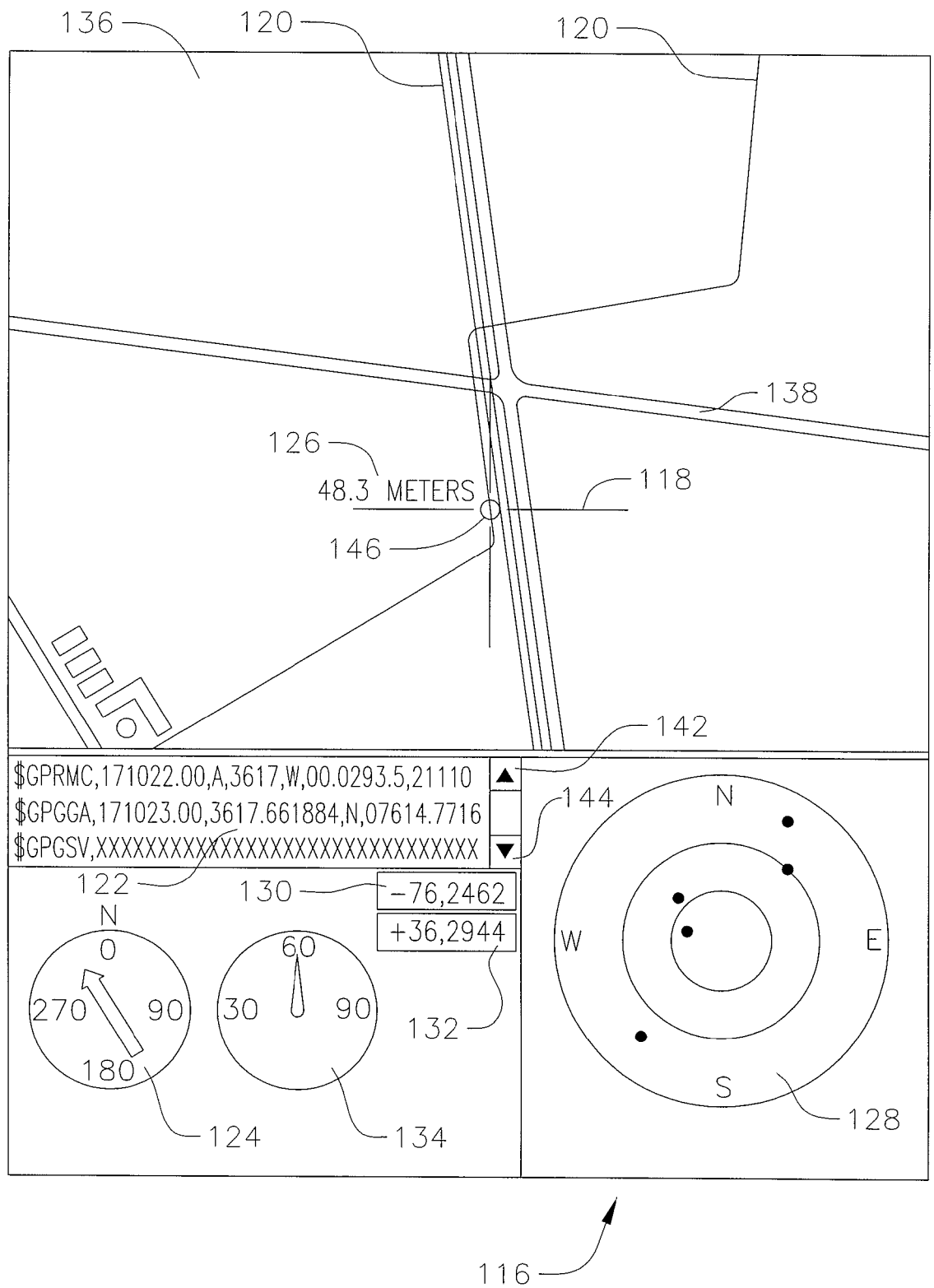
FIG. 16 is a simplified first detailed front elevation view of one embodiment of a display configured in accordance with the invention.
Figure 17:
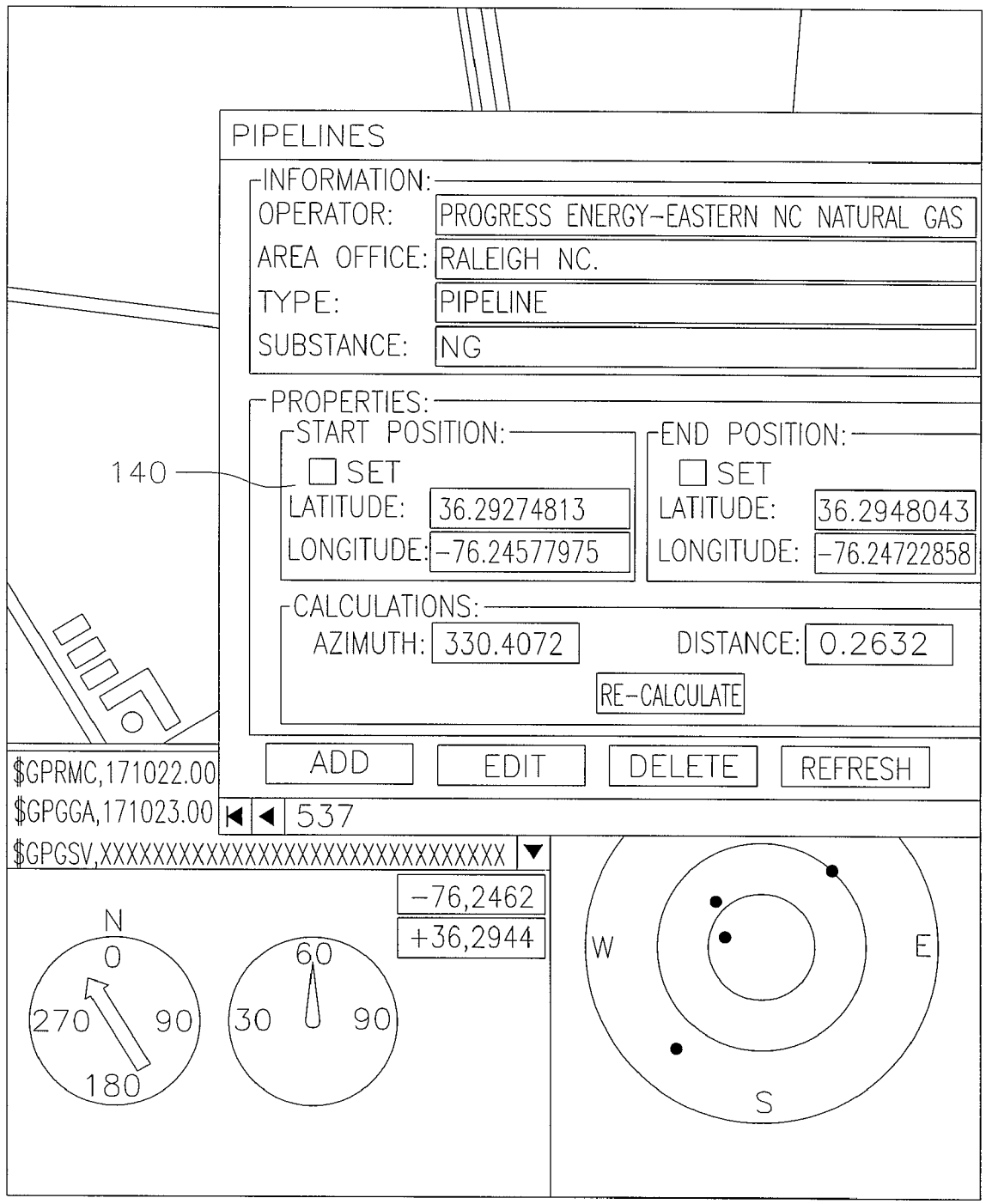
FIG. 17 is a simplified second detailed front elevation view of one embodiment of a display configured in accordance with the teachings of the invention.

Referring now to FIGS. 15-17, a method of dynamically tracking a location of one or more selected utilities as a movement occurs within a municipal service area will now be described. This method is described in U.S. Pat. No. 6,798,379, the disclosure of which is hereby incorporated by reference herein.

In FIG. 15, a first step involves: providing a portable controller, generally indicated by reference numeral 110. Controller 110 has a memory 112 and a global positioning system (GPS) co-ordinate device 114. A scrolling display 116 is also coupled to controller 110.

A second step involves storing in memory 112 a series of GPS co-ordinates 118 for one or more selected utilities 120 within an assigned service area of a municipality as shown in FIG. 16.

Referring to FIG. 15, a third step involves: using GPS co-ordinate device 114 to dynamically provide GPS co-ordinates 118 to controller 110 as positioning of GPS co-ordinate device 114 changes location.

Referring to FIG. 16, a fourth step involves: using scrolling display 116 to display GPS co-ordinates of GPS co-ordinate device 114 on a display 122 of global positioning system co-ordinates, together with a series of GPS co-ordinates 118 for one or more of selected utilities 120, such that the relative position of GPS co-ordinate device 114 to one or more selected utilities 118 is always known.

Referring to FIG. 16, scrolling display 116 has a graphic indicator 124 which indicates a direction of travel for GPS co-ordinate device 114. There is also displayed a numeric indicator 126 which indicates the distance in the direction of travel before GPS co-ordinate device 114 encounters the closest of selected utilities 120. There is also a graphic indicator 128 depicting a target, which graphically indicates the positioning of satellites available to GPS co-ordinate device 114.

Referring to FIG. 16, scrolling display 116 has a numeric indicator 130, which indicates longitude, and a numeric indicator 132, which indicates latitude 132. Display also has a graphic indicator 134, which indicates speed of travel 134 of GPS co-ordinate device 114. Of course, when emergency crews are on foot the speed will be negligible. However, when the emergency crews are traveling in a vehicle, the speed of the vehicle will be indicated.

Referring to FIG. 16, scrolling display 116 places GPS co-ordinates 118 in the context of a geographical map 136 with road infrastructure 138. It is preferred that geographical map 136 may be in the form of an aerial photo.

Referring to FIG. 17, scrolling display 116 has a pop-up display screen 140 which provides vital data identifying characteristics of the closest of selected utilities 120. In the illustrated example, the utility identified is a natural gas pipeline owned by Process Energy-Eastern North Carolina Natural Gas, serviced out of a contact office in Raleigh, N.C.

An important aspect is the dynamic nature of scrolling display 116, which scrolls as the GPS co-ordinates of GPS co-ordinate device 114 change. This scrolling aspect is particularly apparent when the emergency crew is approaching a site in a vehicle. The system continuously scans the GPS data it receives: first, to ascertain the position of GPS—co-ordinate device 114 and second, for relative co-ordinates of utility hazards. All of the displays continually scroll and update the data with movement of GPS co-ordinate device 114. When one gets within a pre-determined area of interest, a circular icon 146 appears on scrolling display 116 and locks onto the closest utility to show the point at which GPS co-ordinate device 114 will cross the utility if it continues in the same direction.

Referring to FIG. 16, scrolling display 116 may also be manually scrolled using an on screen up arrow 142 or an on screen down arrow 144, to enable the emergency crew to manually look ahead, without changing their position.

It should be appreciated that the various components and features described herein may be incorporated in a system independently of the other components and features. For example, a system incorporating the teachings herein may include various combinations of these components and features. Thus, not all of the components and features described herein may be employed in every such system.

Different embodiments of the invention may include a variety of hardware and software processing components. In some embodiments of the invention, hardware components such as controllers, state machines and/or logic are used in a system constructed in accordance with the invention. In some embodiments code such as software or firmware executing on one or more processing devices may be used to implement one or more of the described operations.

Such components may be implemented on one or more integrated circuits. For example, in some embodiments several of these components may be combined within a single integrated circuit. In some embodiments some of the components may be implemented as a single integrated circuit. In some embodiments some components may be implemented as several integrated circuits.

The components and functions described herein may be connected/coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards. In some embodiments some of the connections represented by the lead lines in the drawings may comprise a data network, for example, a local network and/or a wide area network (e.g., the Internet).

The signals discussed herein may take several forms. For example, in some embodiments a signal may be an electrical signal transmitted over a wire while other signals may consist of light pulses transmitted over an optical fiber. A signal may comprise more than one signal. For example, a signal may consist of a series of signals. Also, a differential signal comprises two complementary signals or some other combination of signals. In addition, a group of signals may be collectively referred to herein as a signal. Signals as discussed herein also may take the form of data. For example, in some embodiments an application program may send a signal to another application program. Such a signal may be stored in a data memory.

A wide variety of devices may be used to implement the database and data memories discussed herein. For example, a database or data memory may comprise RAM, ROM, disks, flash memory or other types of data storage devices.

In summary, the invention described herein generally relates to an improved utility management system. While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A computer implemented method of collecting utility location information comprising:
   electronically defining a project including a project area, project criteria, rules applied to the project and data accessibility rights;
   electronically identifying a current location utilizing a first method;
   retrieving a GIS landbase template including map imagery and infrastructure, from a database;
   in substantially real time, integrating an imagery of the project area with the current location to generate an image representation of the project area;
   in substantially real time, displaying the image representation of the project area comprising the current location on a mobile device as a moving map;
   identifying an utility asset within the project area using the displayed moving map;
   obtaining the location of the identified utility asset in accordance with the displayed representation of the project area using a second method different from the first method;
   integrating the obtained location with the GIS landbase template including the map imagery and the infrastructure to create a precision grid including the location of the utility asset the map imagery and the infrastructure;
   storing the precision grid in a first database; and
   managing usage and distribution of the stored precision grid utilizing the defined project criteria, rules applied to the project and data accessibility rights.

2. The method of claim 1, further comprising associating meta-data with the identified utility asset.

3. The method of claim 1, wherein the imagery of the project area comprises a map imagery.

4. The method of claim 1, wherein the imagery of the project area comprises a photo imagery.

5. The method of claim 1, wherein the imagery of the project area comprises an aerial imagery.

6. The method of claim 1, wherein the representation of the project area comprises at least one landmark.

7. The method of claim 6, further comprising verifying the current location in accordance with a location of the at least one landmark.

8. The method of claim 1, wherein the identifying the location of the identified utility asset comprises using at least one of a radar, a sonar, and a transponders.

9. The method of claim 1, further comprising querying a second database to verify the type and material of the identified utility asset; and storing the verified type and material of the identified utility asset in the first database.

10. The method of claim 1, wherein the electronically identifying the current location comprises using real time kinetics.

11. A system for collecting utility location information comprising:
    GPS receiver for identifying a current location;
    a processor configured to process input data for defining a project including a project area, project criteria, rules applied to the project and data accessibility rights, retrieve a GIS landbase template including map imagery and infrastructure from a database, and integrate an imagery of the project area with the current location to generate an image representation of the project area in real time;
    a display for displaying the image representation of the project area comprising the current location as a moving map;
    a location determining device for obtaining the location of an identified utility asset in accordance with the displayed representation of the project area, wherein the processor is further configured to integrate the obtained location with the GIS landbase template including the map imagery and the infrastructure to create a precision grid including the location of the utility asset the map imagery and the infrastructure;
    a first database for storing the precision grid; and
    a database management module for managing usage and distribution of the stored precision grid utilizing the defined project criteria, rules applied to the project and data accessibility rights.

12. The system of claim 11, wherein an accuracy of the current location is on the order of a millimeter.

13. The system of claim 11, further comprising at least one of a radar apparatus, a sonar apparatus, and a transponder sensor configured to identify the location of the utility asset.

14. The system of claim 11, further comprising a second database for storing type and material of a plurality of utility assets.

* * * * *